US012125439B2

(12) United States Patent
Oh et al.

(10) Patent No.: US 12,125,439 B2
(45) Date of Patent: Oct. 22, 2024

(54) DISPLAY DEVICE, DATA DRIVING CIRCUIT AND DISPLAY DRIVING METHOD

(71) Applicant: LG Display Co., Ltd., Seoul (KR)

(72) Inventors: Hyemi Oh, Seoul (KR); Sangwook Lee, Gyeonggi-do (KR); Sojung Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 17/970,422

(22) Filed: Oct. 20, 2022

(65) Prior Publication Data

US 2023/0206839 A1 Jun. 29, 2023

(30) Foreign Application Priority Data

Dec. 27, 2021 (KR) ........................ 10-2021-0188245

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0842* (2013.01); *G09G 2300/0861* (2013.01); *G09G 2310/027* (2013.01); *G09G 2310/08* (2013.01); *G09G 2320/0233* (2013.01); *G09G 2320/045* (2013.01); *G09G 2360/16* (2013.01)

(58) Field of Classification Search
CPC ............... G09G 3/3233; G09G 3/3275; G09G 2300/0842; G09G 2300/0861; G09G 2310/08; G09G 2310/027; G09G 2320/045
See application file for complete search history.

(56) References Cited

U.S. PATENT DOCUMENTS

2015/0138179 A1* 5/2015 Park ..................... G09G 3/3291 345/212
2021/0383763 A1* 12/2021 Kim ..................... H10K 59/131
2023/0012927 A1* 1/2023 Kim ...................... G06F 3/1446

FOREIGN PATENT DOCUMENTS

KR 20160080180 A * 7/2016 ............. H10K 59/00
KR 20170080788 A * 7/2017 ........... G09G 3/3233
KR 20180025798 A * 3/2018 ........... G09G 3/3291

* cited by examiner

*Primary Examiner* — Nelson M Rosario
*Assistant Examiner* — Scott D Au
(74) *Attorney, Agent, or Firm* — Birch, Stewart, Kolasch & Birch, LLP

(57) ABSTRACT

A display device, a data driving circuit and a display driving method are discussed. The display device can include a display panel in which a plurality of subpixel circuits including a light emitting element, a driving transistor, and a sensing transistor are disposed. The display device further can include a gate driving circuit configured to supply a plurality of scan signals to the display panel through a plurality of gate lines, a data driving circuit configured to supply a plurality of data voltages to the display panel through a plurality of data lines and supply a constant current to the plurality of subpixel circuits during a resistance sensing period, and a timing controller configured to control the gate driving circuit and the data driving circuit, and supply compensation image data to the display panel by using the resistance of the sensing transistor detected in the resistance sensing period.

19 Claims, 13 Drawing Sheets

DISPLAY DEVICE, DATA DRIVING CIRCUIT AND DISPLAY DRIVING METHOD

CROSS-REFERENCE TO RELATED APPLICATION

This application claims priority to Korean Patent Application No. 10-2021-0188245, filed in the Republic of Korea on Dec. 27, 2021, the entire contents of which are hereby expressly incorporated by reference into the present application.

BACKGROUND OF THE DISCLOSURE

Field

Embodiments of the present disclosure relate to a display device, a data driving circuit and a display driving method capable of accurately determining and compensating for a characteristic value of a driving transistor.

Description of Related Art

With the development of the information society, there has been an increasing demand for a variety of types of image display devices. In this regard, a range of display devices, such as a liquid crystal display device, and an organic light emitting display device, have recently come into widespread use.

Among these display devices, the organic light emitting display device adopts organic light emitting diodes and thus has fast responsiveness and various merits in contrast ratio, luminous efficiency, brightness, and viewing angle.

In such a display device, pixels each having subpixels are arranged in a matrix pattern on the display panel displaying images. The light emitting element in each subpixel is rendered to emit light by controlling the voltage supplied to the light emitting element, so that the luminance of each subpixel is controlled, and an image is displayed.

Generally, each subpixel defined on the display panel of the display device has a light emitting element and a driving transistor for driving the light emitting element. The characteristic value of the driving transistor such as a threshold voltage or a mobility can vary depending on the driving time or a deviation may occur due to a difference in driving time between subpixels. A deviation in luminance between the subpixels (luminance non-uniformity) may result in image quality degradation.

To address the deviation in luminance between subpixels, there have been techniques for sensing and compensating for the characteristic value of the driving transistor such as a threshold voltage or a mobility using a sensing transistor.

However, since the voltage of the sensing transistor can vary due to the driving current during a sensing period of the characteristic value of the driving transistor, an error may be caused in the sensing result for the characteristic value of the driving transistor.

BRIEF SUMMARY OF THE DISCLOSURE

Accordingly, the inventors of the present disclosure have invented a display device, a data driving circuit, and a display driving method capable of detecting a resistance of a sensing transistor.

Embodiments of the disclosure can provide a display device, a data driving circuit, and a display driving method capable of accurately determining a characteristic value of a driving transistor by detecting a resistance of a sensing transistor before sensing the characteristic value of the driving transistor.

Embodiments of the disclosure can provide a display device, a data driving circuit and a display driving method capable of detecting a resistance of a sensing transistor by sensing a change in a characteristic value according to a change in a data voltage and a driving voltage while a constant current is supplied to a driving transistor.

Embodiments of the disclosure can provide a display device, a data driving circuit and a display driving method capable of accurately compensating for a characteristic value deviation of a driving transistor by accurately determining a characteristic value of a driving transistor using a resistance of a sensing transistor.

Embodiments of the disclosure can provide a display device comprising a display panel in which a plurality of subpixel circuits including a light emitting element, a driving transistor, and a sensing transistor are disposed, a gate driving circuit configured to supply a plurality of scan signals to the display panel through a plurality of gate lines, a data driving circuit configured to supply a plurality of data voltages to the display panel through a plurality of data lines and supply a constant current to the plurality of subpixel circuits during a resistance sensing period, and a timing controller configured to control the gate driving circuit and the data driving circuit, and supply compensation image data to the display panel by using the resistance of the sensing transistor detected in the resistance sensing period.

Embodiments of the disclosure can provide a data driving circuit for supplying a plurality of data voltages to a display panel in which a plurality of subpixel circuits including a light emitting element, a driving transistor, and a sensing transistor are disposed. Here, the data driving circuit can include an analog-to-digital converter configured to convert a sensing voltage detected from a reference voltage line into a digital value, a sampling switch configured to control a connection between the reference voltage line and the analog-to-digital converter, a constant current source configured to supply a constant current to the plurality of subpixel circuits in the resistance sensing period, and a constant current switch configured to control a connection between the constant current source and the reference voltage line.

Embodiments of the disclosure can provide a display driving method of a display panel in which a plurality of subpixel circuits including a light emitting element, a driving transistor, and a sensing transistor are disposed. Here, the method can include setting a resistance sensing period for detecting a resistance of the sensing transistor, supplying a constant current to the plurality of subpixel circuits through a constant current source during the resistance sensing period, detecting a change of a sensing voltage on a reference voltage line while changing a data voltage, calculating the resistance of the sensing transistor, determining a characteristic value of the driving transistor using the resistance of the sensing transistor, and supplying a compensation image data by reflecting the characteristic value of the driving transistor.

According to embodiments of the present disclosure, it is possible to provide a display device, a data driving circuit, and a display driving method capable of detecting a resistance of a sensing transistor.

In addition, according to embodiments of the present disclosure, it is possible to provide a display device, a data driving circuit, and a display driving method capable of accurately determining a characteristic value of a driving transistor by detecting a resistance of a sensing transistor before sensing the characteristic value of the driving transistor.

In addition, according to embodiments of the present disclosure, it is possible to provide a display device, a data driving circuit and a display driving method capable of detecting a resistance of a sensing transistor by sensing a change in a characteristic value according to a change in a data voltage and a driving voltage while a constant current is supplied to a driving transistor.

In addition, according to embodiments of the present disclosure, it is possible to provide a display device, a data driving circuit and a display driving method capable of accurately compensating for a characteristic value deviation of a driving transistor by accurately determining a characteristic value of a driving transistor using a resistance of a sensing transistor.

DETAILED DESCRIPTION OF THE EMBODIMENTS

Figure 1:
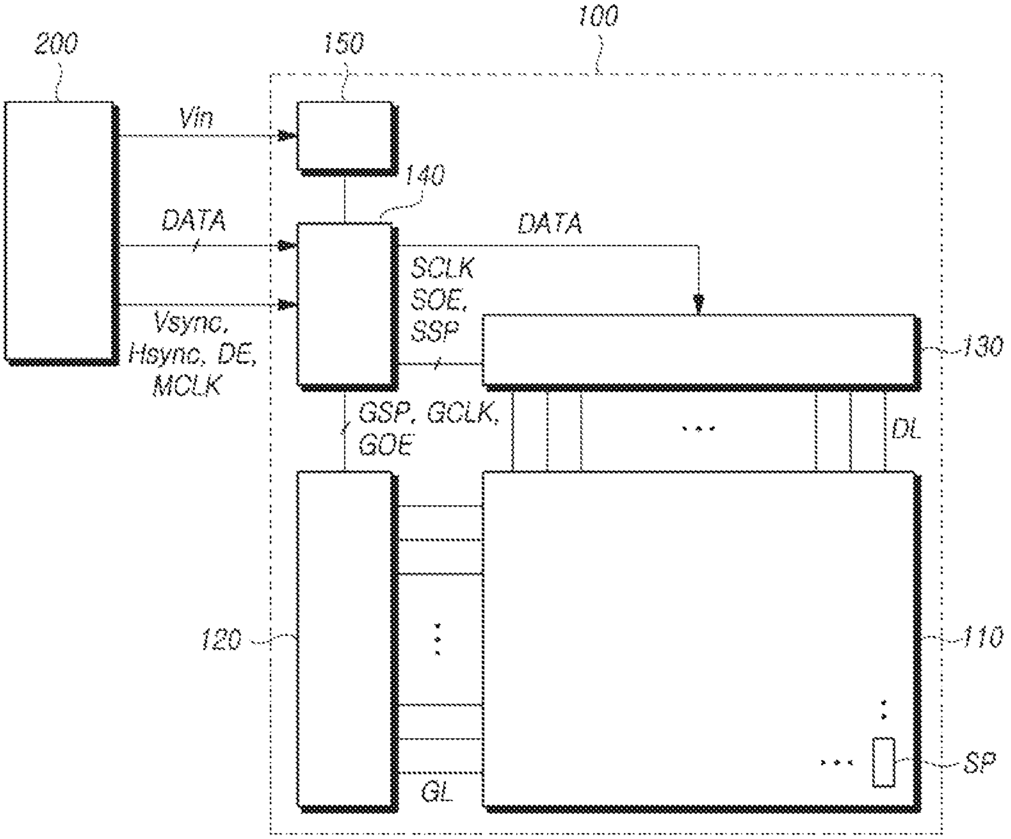
FIG. 1 illustrates a schematic diagram of a display device according to embodiments of the present disclosure.

Hereinafter, some embodiments of the present disclosure will be described in detail with reference to exemplary drawings. In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description can make the subject matter in some embodiments of the present invention rather unclear. The terms such as “including”, “having”, “containing”, “constituting” “make up of”, and “formed of” used herein are generally intended to allow other components to be added unless the terms are used with the term “only”. As used herein, singular forms are intended to include plural forms unless the context clearly indicates otherwise.

Terms, such as “first”, “second”, “A”, “B”, “(A)”, or “(B)” can be used herein to describe elements of the present invention. Each of these terms is not used to define essence, order, sequence, or number of elements etc., but is used merely to distinguish the corresponding element from other elements.

When it is mentioned that a first element “is connected or coupled to”, “contacts or overlaps” etc. a second element, it should be interpreted that, not only can the first element “be directly connected or coupled to” or “directly contact or overlap” the second element, but a third element can also be “interposed” between the first and second elements, or the first and second elements can “be connected or coupled to”, “contact or overlap”, etc. each other via a fourth element. Here, the second element can be included in at least one of two or more elements that “are connected or coupled to”, “contact or overlap”, etc. each other.

When time relative terms, such as “after,” “subsequent to,” “next,” “before,” and the like, are used to describe processes or operations of elements or configurations, or flows or steps in operating, processing, manufacturing methods, these terms can be used to describe non-consecutive or non-sequential processes or operations unless the term “directly” or “immediately” is used together.

In addition, when any dimensions, relative sizes etc. are mentioned, it should be considered that numerical values for an elements or features, or corresponding information (e.g., level, range, etc.) include a tolerance or error range that can be caused by various factors (e.g., process factors, internal or external impact, noise, etc.) even when a relevant description is not specified. Further, the term “may” fully encompasses all the meanings of the term “can”.

Hereinafter, various embodiments of the present disclosure will be described in detail with reference to the accompanying drawings. All the components of each display device according to all embodiments of the present disclosure are operatively coupled and configured.

FIG. 1 is a view schematically illustrating a configuration of a display device according to various embodiments of the disclosure.

Referring to FIG. 1, a display device 100 according to an embodiment of the disclosure can include a display panel 110 where a plurality of gate lines GL and data lines DL are connected, and a plurality of subpixels SP are arranged in a matrix form, a gate driving circuit 120 driving the plurality of gate lines GL, a data driving circuit 130 supplying a data voltage through the plurality of data lines DL, a timing controller 140 controlling the gate driving circuit 120 and the data driving circuit 130, and a power management circuit 150.

The display panel 110 displays an image based on a scan signal transferred from the gate driving circuit 120 through the plurality of gate line GLs GL and the data voltage transferred from the data driving circuit 130 through the plurality of data lines DL.

In the case of a liquid crystal display, the display panel 110 can include a liquid crystal layer formed between two substrates and can be operated in any known mode, such as a twisted nematic (TN) mode, a vertical alignment (VA) mode, an in-plane switching (IPS) mode, or a fringe field switching (FFS) mode. In the case of an organic light emitting display, the display panel 110 can be implemented in a top emission scheme, a bottom emission scheme, or a dual-emission scheme.

In the display panel 110, a plurality of pixels can be arranged in a matrix form, and each pixel can include subpixels SP having different colors, e.g., a white subpixel, a red subpixel, a green subpixel, and a blue subpixel, and each subpixel SP can be defined by the plurality of data lines DL and the plurality of gate lines GL.

One subpixel SP can include, e.g., a thin film transistor (TFT) formed at the intersection between one data line DL and one gate line GL, a light emitting element, such as an organic light emitting diode, charged with the data voltage, and a storage capacitor electrically connected to the light emitting element to maintain the voltage.

For example, when the display device 100 having a resolution of 2,160×3,840 includes four subpixels SP of white (W), red (R), green (G), and blue (B), 3,840 data lines DL can be connected to 2,160 gate lines GL and four subpixels WRGB, and thus, there can be provided 3,840×4=15,360 data lines DL. Each subpixel SP is disposed at the intersection between the gate line GL and the data line DL.

The gate driving circuit 120 can be controlled by the controller 140 to sequentially output scan signals to the plurality of gate lines GL disposed in the display panel 110, controlling the driving timing of the plurality of subpixels SP.

In the display device 100 having a resolution of 2,160×3,840, sequentially outputting the scan signal to the 2,160 gate lines GL from the first gate line to the 2,160th gate line can be referred to as 2,160-phase driving. Sequentially outputting the scan signal to each unit of four gate lines GL, e.g., sequentially outputting the scan signal to the fifth gate line to the eighth gate line after sequentially outputting the scan signal to the first gate line to the fourth gate line, is referred to as 4-phase driving. In other words, sequentially outputting the scan signal to every N gate lines GL can be referred to as N-phase driving.

The gate driving circuit 120 can include one or more gate driving integrated circuits (GDICs). Depending on driving schemes, the gate driving circuit 120 can be positioned on only one side, or each of two opposite sides, of the display panel 110. The gate driving circuit 120 can be implemented in a gate-in-panel (GIP) form which is embedded in the bezel area of the display panel 110.

The data driving circuit 130 receives image data DATA from the timing controller 140 and converts the received image data DATA into an analog data voltage. Then, as the data voltage is output to each data line DL according to the timing when the scan signal is supplied through the gate line GL, each subpixel SP connected to the data line DL displays a light emitting signal having the brightness corresponding to the data voltage.

Likewise, the data driving circuit 130 can include one or more source driving integrated circuits SDIC, and the source driving integrated circuit SDIC can be connected to the bonding pad of the display panel 110 in a tape automated bonding (TAB) type or a chip-on-glass (COG) type or can be disposed directly on the display panel 110.

In some cases, each source driving integrated circuit SDIC can be integrated and disposed on the display panel 110. Further, each source driving integrated circuit SDIC can be implemented in a chip-on-film (COF) type and, in this case, each source driving integrated circuit SDIC can be mounted on a circuit film and can be electrically connected to the data line DL of the display panel 110 through the circuit film.

The timing controller 140 supplies various control signals to the gate driving circuit 120 and the data driving circuit 130 and controls the operation of the gate driving circuit 120 and the data driving circuit 130. In other words, the timing controller 140 can control the gate driving circuit 120 to output a scan signal according to the timing implemented in each frame and, on the other hand, transfers the image data DATA received from the outside to the data driving circuit 130.

In this case, the timing controller 140 receives, from an external host system 200, several timing signals including, e.g., a vertical synchronization signal Vsync, a horizontal synchronization signal Hsync, a data enable signal DE, and a main clock MCLK, together with the image data DATA.

The host system 200 can be any one of a television (TV) system, a set-top box, a navigation system, a personal computer (PC), a home theater system, a mobile device, and a wearable device.

Accordingly, the timing controller 140 can generate a control signal according to various timing signals received from the host system 200 and transfers the control signal to the gate driving circuit 120 and the data driving circuit 130.

For example, the timing controller 140 outputs several gate control signals including, e.g., a gate start pulse GSP, a gate clock GCLK, and a gate output enable signal GOE, to control the gate driving circuit 120. The gate start pulse GSP controls the timing at which one or more gate driving integrated circuits GDIC constituting the gate driving circuit 120 start operation. The gate clock GCLK is a clock signal commonly input to one or more gate driving integrated circuits GDIC and controls the shift timing of the scan signal. The gate output enable signal GOE designates timing information about one or more gate driving integrated circuits GDICs.

The timing controller 140 outputs various data control signals including, e.g., a source start pulse SSP, a source sampling clock SCLK, and a source output enable signal SOE, to control the data driving circuit 130. The source start pulse SSP controls the timing at which one or more source driving integrated circuits SDIC constituting the data driving circuit 130 start data sampling. The source sampling clock SCLK is a clock signal that controls the timing of sampling data in the source driving integrated circuit SDIC. The source output enable signal SOE controls the output timing of the data driving circuit 130.

The display device 100 can further include a power management circuit 150 that supplies various voltages or currents to, e.g., the display panel 110, the gate driving circuit 120, and the data driving circuit 130 or controls various voltages or currents to be supplied.

The power management circuit 150 adjusts the direct current (DC) input voltage Vin supplied from the host system 200, generating power required to drive the display panel 100, the gate driving circuit 120, and the data driving circuit 130.

The subpixel SP is positioned at the intersection between the gate line GL and the data line DL, and a light emitting element can be disposed in each subpixel SP. For example, the organic light emitting display can include a light emitting element, such as an organic light emitting diode, in each subpixel SP and can display an image by controlling the current flowing to the light emitting element according to the data voltage.

The display device 100 can be one of various types of devices, such as liquid crystal displays, organic light emitting displays, or plasma display panels.

Figure 2:
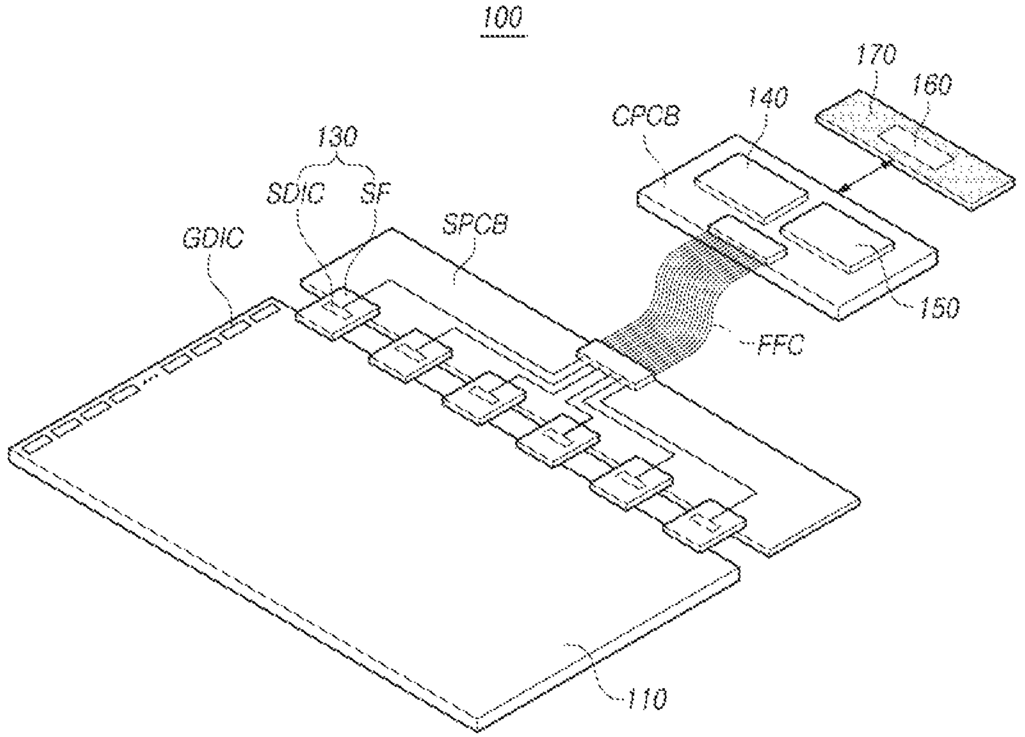
FIG. 2 illustrates a system diagram of the display device according to embodiments of the present disclosure.

FIG. 2 illustrates a system diagram of the display device according to embodiments of the present disclosure.

Referring to FIG. 2, in the display device 100 according to embodiments of the disclosure, the source driving integrated circuit SDIC included in the data driving circuit 130 is implemented in a chip-on-film (COF) type among various types (e.g., TAB, COG, or COF), and the gate driving circuit 120 is implemented in a gate-in-panel (GIP) type among various types (e.g., TAB, COG, COF, or GIP).

When the gate driving circuit 120 is implemented in the GIP type, the plurality of gate driving integrated circuits GDIC included in the gate driving circuit 120 can be directly formed in the bezel area of the display panel 110. In this case, the gate driving integrated circuits GDIC can receive various signals (e.g., a clock signal, a gate high signal, a gate low signal, etc.) necessary for generating scan signals through gate driving-related signal lines disposed in the bezel area.

Likewise, one or more source driving integrated circuits SDIC included in the data driving circuit 130 each can be mounted on the source film SF, and one side of the source film SF can be electrically connected with the display panel 110. Lines for electrically connecting the source driver integrated circuit SDIC and the display panel 110 can be disposed on the source film SF.

The display device 100 can include at least one source printed circuit board SPCB for circuit connection between a plurality of source driving integrated circuits SDIC and other devices and a control printed circuit board CPCB for mounting control components and various electric devices.

The other side of the source film SF where the source driving integrated circuit SDIC is mounted can be connected to at least one source printed circuit board SPCB. In other words, one side of the source film SF where the source driving integrated circuit SDIC is mounted can be electrically connected with the display panel 110, and the other side thereof can be electrically connected with the source printed circuit board SPCB.

The timing controller 140 and the power management circuit 150 can be mounted on the control printed circuit board CPCB. The timing controller 140 can control the operation of the data driving circuit 130 and the gate driving circuit 120. The power management circuit 150 can supply power voltage or current to the display panel 110, the data driving circuit 130, and the gate driving circuit 120 and control the supplied voltage or current.

At least one source printed circuit board SPCB and control printed circuit board CPCB can be circuit-connected through at least one connection member. The connection member can include, e.g., a flexible printed circuit FPC or a flexible flat cable FFC. The at least one source printed circuit board SPCB and control printed circuit board CPCB can be integrated into a single printed circuit board.

The display device 100 can further include a set board 170 electrically connected to the control printed circuit board CPCB. In this case, the set board 170 can also be referred to as a power board. A main power management circuit (M-PMC) 160 for managing the overall power of the display device 100 can be disposed on the set board 170. The main power management circuit 160 can interwork with the power management circuit 150.

In the so-configured display device 100, the power voltage is generated in the set board 170 and transferred to the power management circuit 150 in the control printed circuit board CPCB. The power management circuit 150 transfers a power voltage necessary for display driving or characteristic value sensing to the source printed circuit board SPCB through the flexible printed circuit FPC or flexible flat cable FFC. The power voltage transferred to the source printed circuit board SPCB is supplied to emit light or sense a specific subpixel SP in the display panel 110 through the source driving integrated circuit SDIC.

Each of the subpixels SP arranged in the display panel 110 in the display device 100 can include a light emitting element and a circuit element, e.g., a driving transistor, for driving the organic light emitting diode.

The type and number of circuit elements constituting each subpixel SP can be varied depending on functions to be provided and design schemes.

Figure 3:
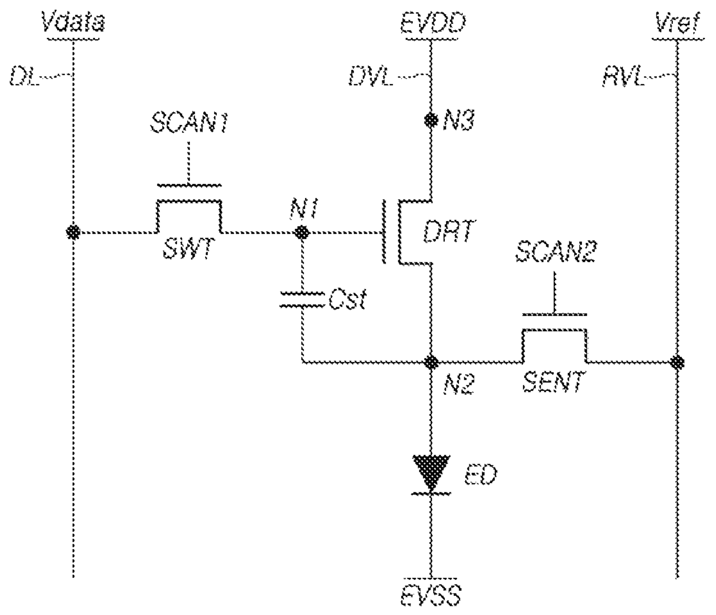
FIG. 3 illustrates a circuit diagram of a subpixel circuit of the display device according to embodiments of the present disclosure.

FIG. 3 illustrates a circuit diagram of a subpixel circuit of the display device according to embodiments of the present disclosure. Each subpixel circuit of the display device of FIG. 1 can be the subpixel circuit shown in FIG. 3.

Referring to FIG. 3, in the display device 100 according to embodiments of the disclosure, the subpixel circuit can include one or more transistors and a capacitor and can have a light emitting element disposed therein.

For example, the subpixel circuit can include a driving transistor DRT, a switching transistor SWT, a sensing transistor SENT, a storage capacitor Cst, and a light emitting element ED.

The driving transistor DRT includes the first node N1, second node N2, and third node N3. The first node N1 of the driving transistor DRT can be a gate node to which the data voltage Vdata is supplied from the data driving circuit 130 through the data line DL when the switching transistor SWT is turned on.

The second node N2 of the driving transistor DRT can be electrically connected with the anode electrode of the light emitting element ED and can be the source node or drain node.

The third node N3 of the driving transistor DRT can be electrically connected with the driving voltage line DVL to which the driving voltage EVDD is supplied and can be the drain node or the source node.

In this case, during a display driving period, a driving voltage EVDD necessary for displaying an image can be supplied to the driving voltage line DVL. For example, the driving voltage EVDD necessary for displaying an image can be 27V.

The switching transistor SWT is electrically connected between the first node N1 of the driving transistor DRT and the data line DL, and the gate line GL is connected to the gate node. Thus, the switching transistor SWT is operated according to the first scan signal SCAN1 supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the second node N2 of the driving transistor DRT and the reference voltage line RVL, and the gate line GL is connected to the gate node. The sensing transistor SENT is operated according to the second scan signal SCAN2 supplied through the gate line GL. When the sensing transistor SENT is turned on, a reference voltage Vref supplied through the reference voltage line RVL is transferred to the second node N2 of the driving transistor DRT.

In other words, as the switching transistor SWT and the sensing transistor SENT are controlled, the voltage of the first node N1 and the voltage of the second node N2 of the driving transistor DRT are controlled, so that the current for driving the light emitting element ED can be supplied.

The gate nodes of the switching transistor SWT and the sensing transistor SENT can be commonly connected to one gate line GL or can be connected to different gate lines GL. An example is shown in which the switching transistor SWT and the sensing transistor SENT are connected to different gate lines GL in which case the switching transistor SWT and the sensing transistor SENT can be independently controlled by the first scan signal SCAN1 and the second scan signal SCAN2 transferred through different gate lines GL.

In contrast, if the switching transistor SWT and the sensing transistor SENT are connected to one gate line GL, the switching transistor SWT and the sensing transistor SENT can be simultaneously controlled by the first scan signal SCAN1 or second scan signal SCAN2 transferred through one gate line GL, and the aperture ratio of the subpixel SP can be increased.

The transistor disposed in the subpixel circuit can be an N-type transistor or a P-type transistor and, in the shown example, the transistor is an N-type transistor.

The storage capacitor Cst is electrically connected between the first node N1 and second node N2 of the driving transistor DRT and maintains the data voltage Vdata during one frame.

The storage capacitor Cst can also be connected between the first node N1 and third node N3 of the driving transistor DRT depending on the type of the driving transistor DRT. The anode electrode of the light emitting element ED can be electrically connected with the second node N2 of the driving transistor DRT, and a base voltage EVSS can be supplied to the cathode electrode of the light emitting element ED.

The base voltage EVSS can be a ground voltage or a voltage higher or lower than the ground voltage. The base voltage EVSS can be varied depending on the driving state. For example, the base voltage EVSS at the time of display driving and the base voltage EVSS at the time of sensing driving can be set to differ from each other.

The switching transistor SWT and the sensing transistor SENT can be referred to as scan transistors controlled through scan signals SCAN1 and SCAN2.

The structure of the subpixel SP can further include one or more transistors or, in some cases, further include one or more capacitors.

In this case, to effectively sense a characteristic value, e.g., threshold voltage or mobility, of the driving transistor DRT, the display device 100 can use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel. Thus, the reference voltage line RVL can also be referred to as a sensing line or a sensing channel.

More specifically, the characteristic value or a change in the characteristic value of the driving transistor DRT can correspond to a difference between the gate node voltage and the source node voltage of the driving transistor DRT.

The compensation for the characteristic value of the driving transistor DRT can be performed by external compensation that senses and compensates for the characteristic value of the driving transistor DRT using an external compensation circuit or internal compensation that senses and compensates for the characteristic value of the driving transistor DRT inside the subpixel SP, rather than using an additional external configuration.

In this case, the external compensation can be performed before the display device 100 is shipped out, and the internal compensation can be performed after the display device 100 is shipped out. However, internal compensation and external compensation can be performed together even after the display device 100 is shipped out.

Figure 4:
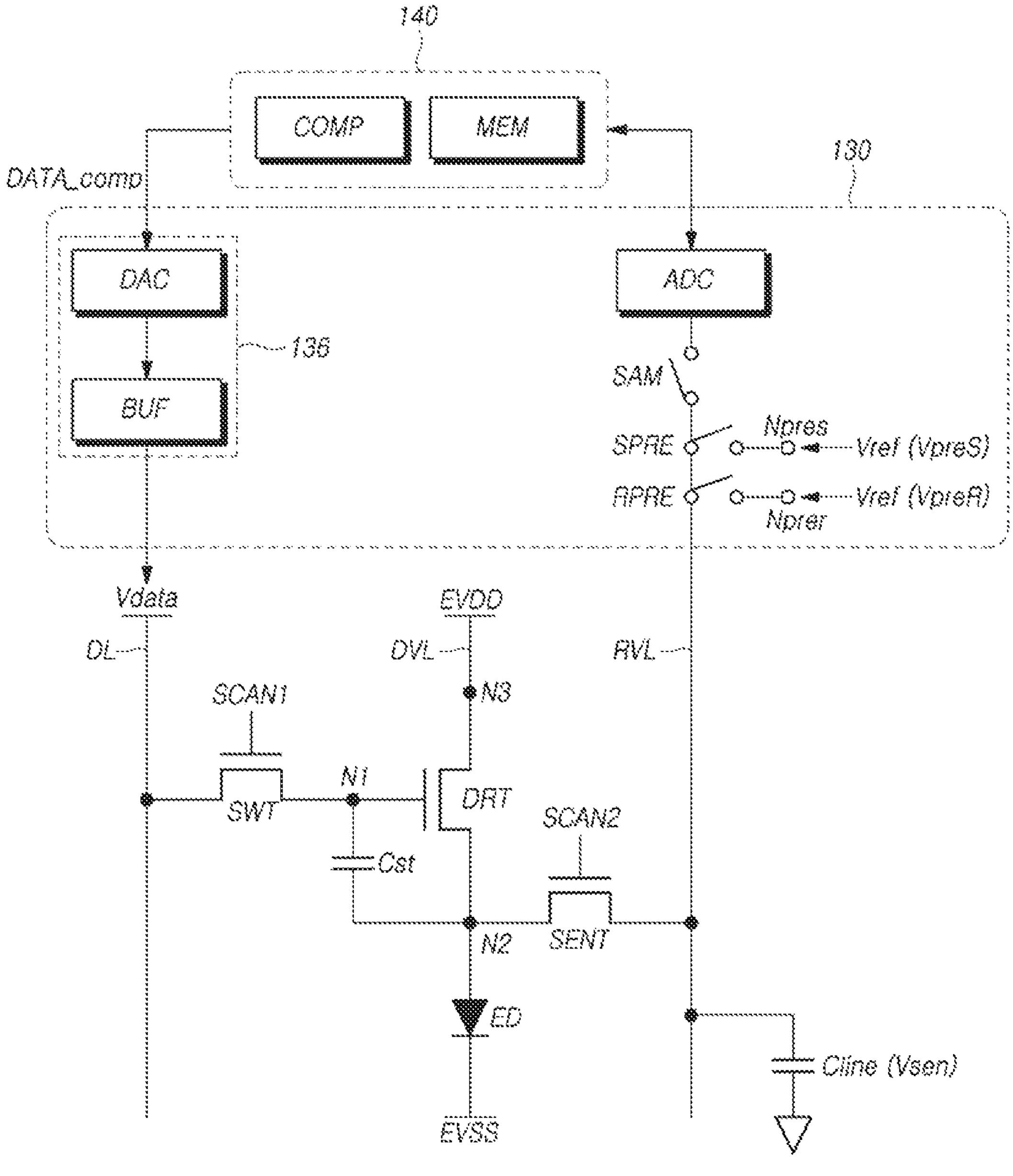
FIG. 4 illustrates an example circuit structure of sensing a characteristic value of a driving transistor.

FIG. 4 illustrates an example circuit structure of sensing a characteristic value of a driving transistor.

Referring to FIG. 4, a display device 100 can include components for compensating for a characteristic value deviation of a driving transistor DRT.

For example, in the sensing period of the display device 100, the characteristic value or a change in the characteristic value of the driving transistor DRT can be supplied as the voltage (e.g., Vdata-Vth) of the second node N2 of the driving transistor DRT. The voltage of the second node N2 of the driving transistor DRT can correspond to the voltage of the reference voltage line RVL when the sensing transistor SENT is in the turned-on state. The line capacitor Cline on the reference voltage line RVL can be charged by the voltage of the second node N2 of the driving transistor DRT. The reference voltage line RVL can have a voltage corresponding to the voltage of the second node N2 of the driving transistor DRT due to the sensing voltage Vsen charged to the line capacitor Cline.

The display device 100 can include an analog-to-digital converter ADC that measures the voltage of the reference voltage line RVL corresponding to the voltage of the second node N2 of the driving transistor DRT and converts the voltage into a digital value and a switch circuit SAM and SPRE for sensing the characteristic value.

The switch circuit SAM and SPRE for controlling the sensing driving can include a sensing reference switch SPRE for controlling the connection between each reference voltage line RVL and the sensing reference voltage supply node Npres to which the reference voltage Vref is supplied and a sampling switch SAM for controlling the connection between each reference voltage line RVL and the analog-to-digital converter ADC. The sensing reference switch SPRE is a switch for controlling sensing driving, and the reference voltage Vref supplied to the reference voltage line RVL by the sensing reference switch SPRE becomes the sensing reference voltage VpreS.

The switch circuit for sensing the characteristic value of the driving transistor DRT can include a display reference switch RPRE for controlling display driving. The display reference switch RPRE can control the connection between each reference voltage line RVL and the display reference voltage supply node Nprer to which the reference voltage Vref is supplied. The display reference switch RPRE is a switch used to drive the display, and the reference voltage Vref supplied to the reference voltage line RVL by the display reference switch RPRE corresponds to the display reference voltage VpreR.

In this case, the sensing reference switch SPRE and the display reference switch RPRE can be separately provided or can be integrated into one. The sensing reference voltage VpreS and the display reference voltage VpreR can have the same voltage value or different voltage values.

The timing controller 140 of the display device 100 can include a memory MEM for storing the data transferred from the analog-to-digital converter ADC or previously storing a reference value and a compensation circuit COMP that compares the reference value stored in the memory MEM and the received data and compensates for the deviation in characteristic value. In this case, the compensation value calculated by the compensation circuit COMP can be stored in the memory MEM.

Accordingly, the timing controller 140 can compensate for the image data DATA to be supplied to the data driving circuit 130 by using the compensation value calculated by the compensation circuit COMP and can output the compensated image data DATA_comp to the data driving circuit 130. Accordingly, the data driving circuit 130 can convert the compensated image data DATA comp into an analog signal type of data voltage Vdata through a digital-to-analog converter DAC and output the converted data voltage Vdata to the data line DL through an output buffer BUF. As a result, the deviation in characteristic value (e.g., deviation in threshold voltage deviation or deviation in mobility) for the driving transistor DRT in the corresponding subpixel SP can be compensated.

As described above, the period for sensing the characteristic value (threshold voltage and mobility) of the driving transistor DRT can be performed after the power-on signal is generated and before display driving starts. For example, if a power-on signal is supplied to the display device 100, the timing controller 140 loads parameters necessary for driving the display panel 110 and then drives the display. In this case, the parameters necessary for driving the display panel 110 can include information about the sensing and compensation for characteristic values previously performed on the display panel 110. In the parameter loading process, the sensing of characteristic values of the driving transistor DRT can be performed. As described above, a process in which the characteristic value is sensed in the parameter loading process after the power-on signal is generated and before the subpixel emits light is referred to as an on-sensing process.

Alternatively, a period in which the characteristic value of the driving transistor DRT is sensed can proceed after a power-off signal of the display device 100 is generated. For example, when a power-off signal is generated in the display device 100, the timing controller 140 can cut off the data voltage supplied to the display panel 110 and can sense the driving characteristic value of the driving transistor DRT for a predetermined time. As such, a process in which sensing of the characteristic value is performed in a state in which the data voltage is cut off as a power-off signal is generated so that emission of the subpixel is terminated is referred to as an off-sensing process.

The sensing period for the characteristic value of the driving transistor DRT can be performed in real time while the display is driven. This sensing process is referred to as a real-time (RT) sensing process. In the real-time sensing process, the sensing process can be performed on one or more subpixels SP in one or more subpixel SP lines, each blank period during the display driving period.

In other words, during the display driving period when an image is displayed on the display panel 110, a blank period in which the data voltage is not supplied to the subpixel SP exists within one frame or between the nth frame and the (n+1) th frame and, in the blank period, mobility sensing for one or more subpixels SP can be performed.

As such, when the sensing process is performed in the blank period, the subpixel (SP) line on which the sensing process is performed can be randomly selected. Accordingly, after the sensing process in the blank section is performed, an abnormality that can appear in the display driving period can be alleviated. After the sensing process is performed during the blank period, the compensated data voltage can be supplied to the subpixels SP where the sensing process has been performed during the display driving period. Accordingly, abnormalities in the subpixel SP line where the sensing process has been completed in the display driving period after the sensing process in the blank period can be further alleviated.

The data driving circuit 130 can include a data voltage output circuit 136 including a latch circuit, a digital-to-analog converter DAC, and an output buffer BUF and, in some cases, the data driving circuit 130 can further include an analog-to-digital converter ADC and various switches SAM, SPRE, and RPRE. Alternatively, the analog-to-digital converter C and various switches SAM, SPRE, and RPRE can be positioned outside the data driving circuit 130.

The compensation circuit COMP can be present inside or outside the timing controller 140. The memory MEM can be positioned outside the timing controller 140 or can be implemented, in the form of a register, inside the timing controller 140.

Figure 5:
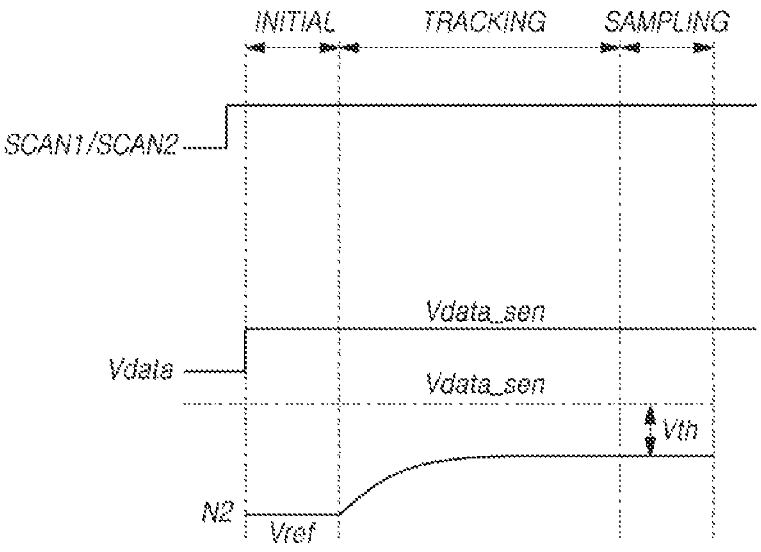
FIG. 5 illustrates a signal timing diagram of external compensation for a threshold voltage of a driving transistor.

FIG. 5 illustrates a signal timing diagram of external compensation for a threshold voltage of a driving transistor.

Referring to FIG. 5, the sensing of the threshold voltage Vth of the driving transistor DRT in the display device 100 can be performed in an initialization phase INITIAL, a tracking phase TRACKING, and a sampling phase SAMPLING.

In this case, since the switching transistor SWT and the sensing transistor SENT are simultaneously turned on and turned off for sensing the threshold voltage Vth of the driving transistor DRT, the first scan signal SCAN1 and the second scan signal SCAN2 together can be supplied through one gate line GL, or the first scan signal SCAN1 and the second scan signal SCAN2 are supplied at the same time through different gate lines GL.

The initialization phase INITIAL is a period in which the second node N2 of the driving transistor DRT is charged with the reference voltage Vref for sensing the threshold voltage Vth of the driving transistor DRT, and the first scan signal SCAN1 and the second scan signal SCAN2 which have high levels can be supplied through the gate line GL.

The tracking phase TRACKING is a period in which charges are charged to the storage capacitor Cst after the charging of the second node N2 of the driving transistor DRT is completed.

The sampling phase SAMPLING is a period in which a current flowed by the charge charged to the storage capacitor Cst is detected after the storage capacitor Cst of the driving transistor DRT is charged.

If the first scan signal SCAN1 and the second scan signal SCAN2 of the turn-on level are simultaneously supplied in the initialization phase INITIAL, the switching transistor SWT is turned on. Accordingly, the first node N1 of the driving transistor DRT is initialized to the sensing data voltage Vdata_sen for sensing the threshold voltage Vth.

The sensing transistor SENT is also turned on by the first scan signal SCAN1 and the second scan signal SCAN2 of the turn-on level, and the reference voltage Vref is supplied through the reference voltage line RVL, so that the second node N2 of the driving transistor DRT is initialized to the reference voltage Vref.

In the tracking phase TRACKING, the voltage of the second node N2 of the driving transistor DRT reflecting the threshold voltage Vth of the driving transistor DRT is tracked. To this end, in the tracking phase TRACKING, the switching transistor SWT and the sensing transistor SENT can remain in the turned-on state, and the reference voltage Vref supplied through the reference voltage line RVL is cut off.

Accordingly, the second node N2 of the driving transistor DRT can float, and the voltage of the second node N2 voltage of the driving transistor DRT starts to rise from the reference voltage Vref. In this case, since the sensing transistor SENT is on, the increase in the voltage of the second node N2 of the driving transistor DRT leads to an increase in the voltage of the reference voltage line RVL.

In this process, the voltage of the second node N2 of the driving transistor DRT is increased and then saturated. The saturation voltage at the time when the second node N2 of the driving transistor DRT reaches the saturated state can correspond to the difference (Vdata_sen-Vth) between the sensing data voltage Vdata_sen for sensing the threshold voltage Vth and the threshold voltage Vth of the driving transistor DRT.

In the sampling phase SAMPLING, the high-level first scan signal SCAN1 and second scan signal SCAN2 to the gate line GL is maintained, and the charge charged in the storage capacitor Cst of the driving transistor DRT is sensed by the characteristic value sensing circuit included in the data driving circuit 130.

Figure 6:
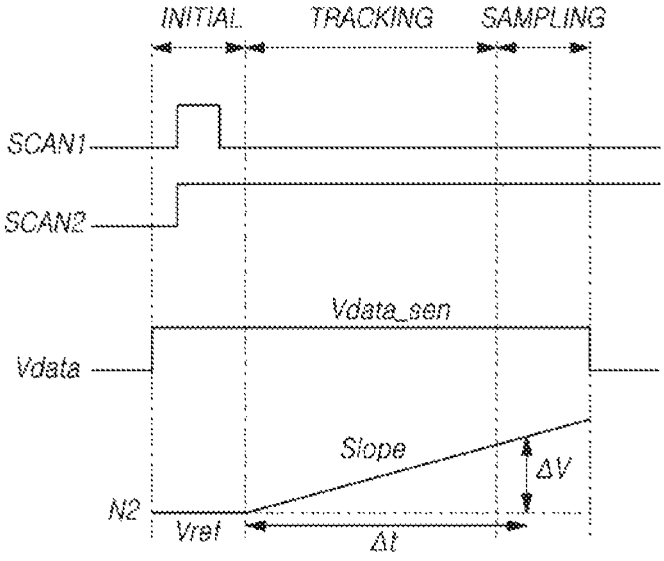
FIG. 6 illustrates a signal timing diagram of external compensation for mobility of a driving transistor.

FIG. 6 illustrates a signal timing diagram of external compensation for mobility of a driving transistor.

Referring to FIG. 6, like the sensing of the threshold voltage Vth, the sensing of the mobility of the driving transistor DRT in the display device 100 can be performed in an initialization phase INITIAL, a tracking phase TRACKING, and a sampling phase SAMPLING.

In the initialization phase INITIAL, the switching transistor SWT can be turned on by the first scan signal SCAN1 of the turn-on level, so that the first node N1 of the driving transistor DRT is initialized to the sensing data voltage Vdata_sen for mobility sensing. Further, the sensing transistor SENT is turned on by the second scan signal SCAN2 of the turn-on level and, in this state, the second node N2 of the driving transistor DRT is initialized to the reference voltage Vref.

The tracking phase TRACKING is a phase for tracking the mobility of the driving transistor DRT. The mobility of the driving transistor DRT can indicate the current driving capability of the driving transistor DRT, and the voltage of the second node N2 of the driving transistor DRT capable of calculating the mobility of the driving transistor DRT is tracked through the tracking phase TRACKING.

In the tracking phase TRACKING, the switching transistor SWT is turned off by the first scan signal SCAN1 of the turn-off level, and the switch where the reference voltage Vref is supplied is cut off. Accordingly, both the first node N1 and the second node N2 of the driving transistor DRT float, and the voltages of the first node N1 and the second node N2 of the driving transistor DRT, both, increase.

In particular, since the voltage of the second node N2 of the driving transistor DRT is initialized to the reference voltage Vref, it starts to increase from the reference voltage Vref. In this case, since the sensing transistor SENT is on, the increase in the voltage of the second node N2 of the driving transistor DRT leads to an increase in the voltage of the reference voltage line RVL.

In the sampling phase SAMPLING, the characteristic value sensing circuit detects the voltage of the second node N2 of the driving transistor DRT, a predetermined time Δt after the voltage of the second node N2 starts to increase.

Here, it has illustrated a case in which the sensing data voltage Vdata_sen is supplied through the data line DL while the sampling phase SAMPLING is in progress. However, if the data voltage Vdata is continuously supplied while the sampling phase SAMPLING is in progress, the voltage of the second node N2 of the driving transistor DRT can be changed. Therefore, the data voltage Vdata of the black grayscale can be supplied through the data line DL while the sampling phase SAMPLING is in progress in order for stable voltage detection.

In this case, the sensing voltage detected by the characteristic value sensing circuit indicates a voltage Vref+ΔV which is the reference voltage Vref plus a predetermined voltage ΔV, and the mobility of the driving transistor DRT can be calculated based on the so-detected sensing voltage Vref+ΔV, the reference voltage Vref which is already known, and the increment time Δt of the voltage of the second node N2.

In other words, the mobility of the driving transistor DRT is proportional to the voltage variation ΔV/Δt per unit time of the reference voltage line RVL through the tracking phase TRACKING and the sampling phase SAMPLING. Accordingly, the mobility of the driving transistor DRT will be proportional to the slope of the voltage waveform of the reference voltage line RVL.

Figure 7:
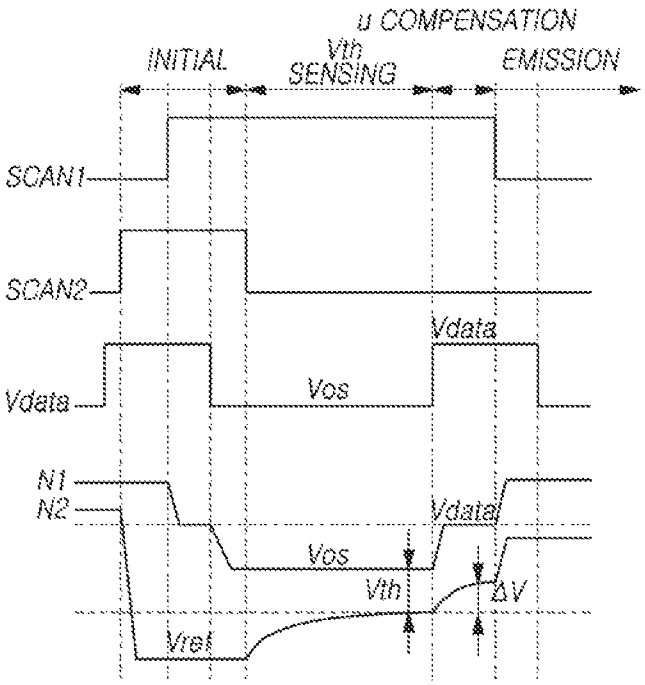
FIG. 7 illustrates a signal timing diagram of internal compensation for a threshold voltage and mobility of a driving transistor.

FIG. 7 illustrates a signal timing diagram of internal compensation for a threshold voltage and mobility of a driving transistor.

Referring to FIG. 7, the internal compensation process for the characteristic value of the driving transistor DRT in the display device 100 can include an initialization phase INITIAL, a threshold voltage sensing phase Vth SENSING, a mobility compensation phase u COMPENSATION, and an emission phase EMISSION.

In the initialization phase INITIAL, the sensing transistor SENT is first turned on by the second scan signal SCAN2 with a high level, and the voltage of the second node N2, for example, the source node voltage of the driving transistor DRT is initialized to the reference voltage Vref.

Thereafter, the switching transistor SWT is turned on by the first scan signal SCAN1 with a high level, and the driving transistor DRT is turned on by the data voltage Vdata being supplied to the first node N1, for example, the gate node of the driving transistor DRT. Subsequently, when the data voltage Vdata is lowered to the level of the offset voltage Vos, the voltage of the first node N1 becomes the level of the offset voltage Vos.

When the sensing transistor SENT is turned off by the second scan signal SCAN2 being supplied at a low level in the threshold voltage sensing phase Vth SENSING, the voltage of the second node N2 through the driving transistor DRT rises to the difference voltage between the offset voltage Vos and the threshold voltage Vth of the driving transistor DRT, and eventually the storage capacitor Cst is charged to the level of the threshold voltage Vth.

In the mobility compensation phase u COMPENSATION, the first node N1 rises to the level of the data voltage Vdata by supplying a gray scale to be displayed, for example, the corresponding data voltage Vdata to the display panel 110. Accordingly, the second node N2 is gradually charged according to the mobility characteristic of the driving transistor DRT, and as a result, difference voltage obtained by subtracting the voltage variation ΔV according to the offset voltage Vos and the mobility from the sum of the data voltage Vdata and the threshold voltage Vth is stored in the storage capacitor Cst.

In the emission phase EMISSION, the switching transistor SWT is turned off by the first scan signal SCAN1 being supplied with a low level. Accordingly, a current in which the threshold voltage Vth and the mobility of the driving transistor DRT are compensated by the voltage level stored in the storage capacitor Cst is supplied to the light emitting element ED.

The internal or external compensation can be performed after a power-on signal is generated and before the display driving operation is started. For example, when the power-on signal is supplied to the display device 100, the timing controller 140 loads parameters necessary for driving the display panel 110 and then performs a display driving operation.

At this time, since the sensing process for the threshold voltage of the driving transistor DRT can take a long time for saturating the voltage at the second node N2 of the driving transistor DRT, the sensing and compensating process for the threshold voltage Vth is mainly performed in the off-sensing process. On the other hand, since the sensing process for the mobility of the driving transistor DRT takes a relatively short time compared to the sensing process for the threshold voltage Vth, the sensing and compensating process for the mobility can be performed in the real-time sensing process.

As described above, the threshold voltage or mobility of the driving transistor DRT constituting the subpixel SP can be varied according to the driving time, or can have a deviation due to the difference in the driving time of each subpixel SP. As a result, since the luminance of the subpixel SP can be varied depending on the characteristic value of the driving transistor DRT, the characteristic value of the driving transistor DRT can be referred to as the characteristic value of the subpixel SP.

Meanwhile, a plurality of pixels can be arranged in a certain arrangement on the display panel 110, and each pixel can be formed of a plurality of subpixels SP emitting different colors.

However, the voltage of the sensing transistor SENT can be changed due to a change in the driving current while sensing the characteristic value of the driving transistor DRT. An error can occur in the sensing voltage Vsen with respect to the characteristic value of the driving transistor DRT due to the voltage deviation of the sensing transistor SENT.

Figure 8:
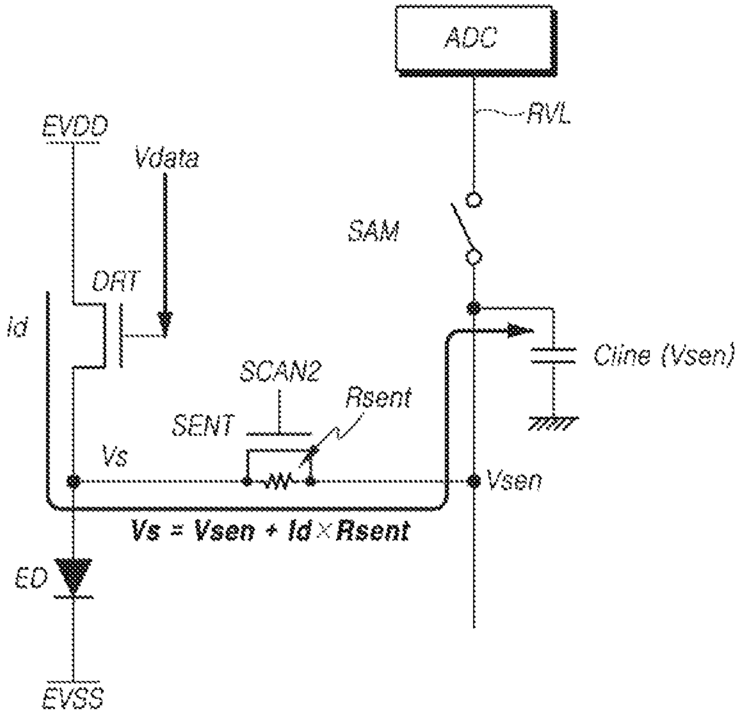
FIG. 8 illustrates a conceptual diagram which an error occurs in a sensing voltage due to a voltage deviation of the sensing transistor in the process of sensing the characteristic value of the driving transistor.

FIG. 8 illustrates a conceptual diagram which an error occurs in a sensing voltage due to a voltage deviation of the sensing transistor in the process of sensing the characteristic value of the driving transistor.

Referring to FIG. 8, the change in the characteristic value of the driving transistor DRT in the sensing period of the display device 100 can be reflected as a source node voltage Vs of the driving transistor DRT. In this case, the source node voltage Vs of the driving transistor DRT can correspond to a voltage of the reference voltage line RVL when the sensing transistor SENT is turned on.

In addition, the line capacitor Cline of the reference voltage line RVL can be charged by the source node voltage Vs of the driving transistor DRT, and the sensing voltage Vsen charged in the line capacitor Cline. The reference voltage line RVL can have a voltage corresponding to the source node voltage Vs of the driving transistor DRT.

However, the voltage of the sensing transistor SENT and the sensing voltage Vsen charged in the line capacitor Cline can be changed due to the fluctuation of the driving current Id flowing through the driving transistor DRT and the sensing transistor SENT in the process of sensing the characteristic value of the driving transistor DRT.

For example, the source node voltage Vs of the driving transistor DRT will be value corresponding to the sum of the sensing voltage Vsen formed in the reference voltage line RVL and a voltage formed in the sensing transistor SENT since the sensing transistor SENT is positioned between the source node of the driving transistor DRT and the reference voltage line RVL.

At this time, the voltage formed in the sensing transistor SENT T will be a value obtained by multiplying the resistance Rsent between the source node and the drain node of the sensing transistor SENT by the driving current Id flowing through the sensing transistor SENT. Accordingly, the source node voltage Vs of the driving transistor DRT can be expressed as below:

$$Vs = \text{Vsen} + Id \times \text{Rsent}$$

At this time, when the voltage Id×Rsent between the source node and the drain node of the sensing transistor SENT is changed in the process of sensing the characteristic value of the driving transistor DRT, it is difficult to accurately measure the characteristic value of the driving transistor DRT since the sensing voltage Vsen detected through the reference voltage line RVL is also changed.

Accordingly, the present disclosure detects the resistance Rsent of the sensing transistor SENT using a constant current source before sensing the characteristic value of the driving transistor DRT, and then accurately measures the characteristic value of the driving transistor DRT using the resistance Rsent of the sensing transistor SENT.

Figure 9:
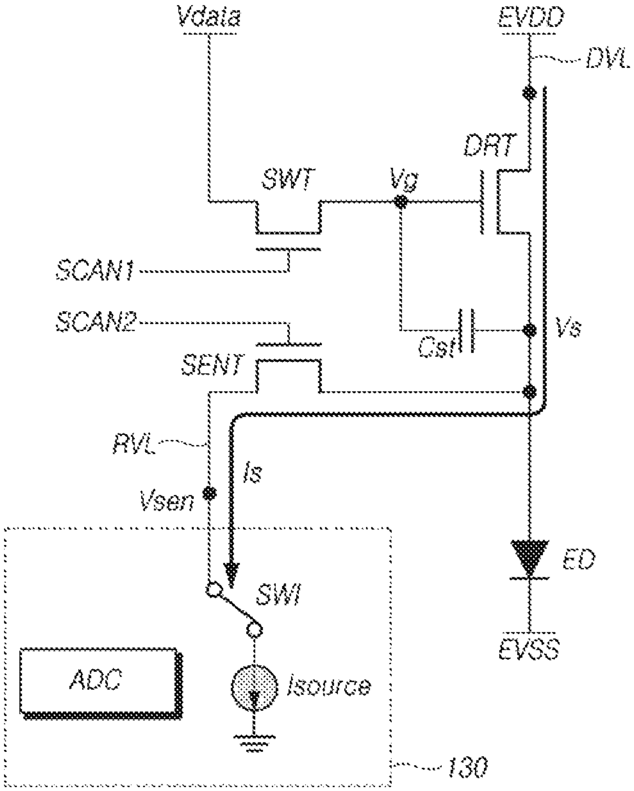
FIG. 9 illustrates an exemplary circuit structure for detecting a resistance of a sensing transistor in a display device according to embodiments of the present disclosure.

FIG. 9 illustrates an exemplary circuit structure for detecting a resistance of a sensing transistor in a display device according to embodiments of the present disclosure.

Referring to FIG. 9, the subpixel circuit in the display device 100 according to embodiments of the disclosure can include one or more transistors and a capacitor and can have a light emitting element disposed therein.

For example, the subpixel circuit can include a driving transistor DRT, a switching transistor SWT, a sensing transistor SENT, a storage capacitor Cst, and a light emitting element ED.

The driving transistor DRT has a gate node corresponding to a first node, a source node corresponding to a second node, and a drain node corresponding to a third node. The data voltage Vdata is supplied to the gate node of the driving transistor DRT through the data line DL when the switching transistor SWT is turned on.

The source node of the driving transistor DRT can be electrically connected to an anode electrode of the light emitting element ED.

The drain node of the driving transistor DRT can be electrically connected to the driving voltage line DVL to which the driving voltage EVDD is applied.

In this case, during a display driving period, a driving voltage EVDD necessary for displaying an image can be supplied to the driving voltage line DVL. For example, the driving voltage EVDD necessary for displaying an image can be 27V.

The switching transistor SWT is electrically connected between the gate node of the driving transistor DRT and the data line DL, and is operated according to the first scan signal SCAN1 supplied through the gate line GL. When turned on, the switching transistor SWT transfers the data voltage Vdata supplied through the data line DL to the gate node of the driving transistor DRT, thereby controlling the operation of the driving transistor DRT.

The sensing transistor SENT is electrically connected between the source node of the driving transistor DRT and the reference voltage line RVL, and is operated according to the second scan signal SCAN2 supplied through the gate line GL. When the sensing transistor SENT is turned on, a reference voltage Vref supplied through the reference voltage line RVL is transferred to the source node of the driving transistor DRT.

In other words, as the switching transistor SWT and the sensing transistor SENT are controlled, the gate node voltage Vg and the source node voltage Vs of the driving transistor DRT are controlled, so that the current for driving the light emitting element ED can be supplied.

The gate nodes of the switching transistor SWT and the sensing transistor SENT can be commonly connected to one gate line GL or can be connected to different gate lines GL. An example is shown in which the switching transistor SWT and the sensing transistor SENT are connected to different gate lines GL in which case the switching transistor SWT and the sensing transistor SENT can be independently controlled by the first scan signal SCAN1 and the second scan signal SCAN2 transferred through different gate lines GL.

In contrast, if the switching transistor SWT and the sensing transistor SENT are connected to one gate line GL, the switching transistor SWT and the sensing transistor SENT can be simultaneously controlled by the first scan signal SCAN1 or second scan signal SCAN2 transferred through one gate line GL, and the aperture ratio of the subpixel SP can be increased.

The transistor disposed in the subpixel circuit can be an N-type transistor or a P-type transistor and, in the shown example, the transistor is an N-type transistor.

The storage capacitor Cst is electrically connected between the first node N1 and second node N2 of the driving transistor DRT and maintains the data voltage Vdata during one frame.

The storage capacitor Cst can also be connected between the gate node and drain node of the driving transistor DRT depending on the type of the driving transistor DRT. The anode electrode of the light emitting element ED can be electrically connected with the source node of the driving transistor DRT, and a base voltage EVSS can be supplied to the cathode electrode of the light emitting element ED.

The base voltage EVSS can be a ground voltage or a voltage higher or lower than the ground voltage. The base voltage EVSS can be varied depending on the driving state. For example, the base voltage EVSS at the time of display driving and the base voltage EVSS at the time of sensing driving can be set to differ from each other.

The structure of the subpixel SP can further include one or more transistors or, in some cases, further include one or more capacitors.

In this case, to effectively sense a characteristic value, e.g., threshold voltage or mobility, of the driving transistor DRT, the display device 100 can use a method for measuring the current flowed by the voltage charged to the storage capacitor Cst during a characteristic value sensing period of the driving transistor DRT, which is called current sensing.

In other words, it is possible to figure out the characteristic value, or a variation in characteristic value, of the driving transistor DRT in the subpixel SP by measuring the current flowed by the voltage charged to the storage capacitor Cst during the characteristic value sensing period of the driving transistor DRT.

In this case, the reference voltage line RVL serves not only to transfer the reference voltage Vref but also as a sensing line for sensing the characteristic value of the driving transistor DRT in the subpixel. Thus, the reference voltage line RVL can also be referred to as a sensing line or a sensing channel.

More specifically, the characteristic value or a change in the characteristic value of the driving transistor DRT can correspond to a difference between the gate node voltage and the source node voltage of the driving transistor DRT.

In this structure, the display device 100 according to embodiments of the present disclosure detects the resistance Rsent of the sensing transistor SENT in advance before sensing the characteristic value of the driving transistor DRT in order to accurately sense the characteristic value of the driving transistor DRT.

For the purpose of above, a constant current source Isource is arranged in the display device 100 of the present disclosure arranges, and the display device 100 can detect the resistance Rsent of the sensing transistor SENT by using a constant current Is flowing through the subpixel circuit before sensing the characteristic value of the driving transistor DRT.

The constant current source Isource can be disposed in the data driving circuit 130, and the reference voltage line RVL can be electrically connected to the constant current source Isource by the operation of the constant current switch SWI.

For example, the display device 100 of the present disclosure can provide a resistance sensing period for detecting the resistance Rsent of the sensing transistor SENT before sensing the characteristic value of the driving transistor DRT. In a state in which a constant current Is flows to the subpixel circuit through the constant current source Isource during the resistance sensing period, the resistance Rsent of the sensing transistor SENT can be calculated by detecting a change of the sensing voltage Vsen being formed on the reference voltage line RVL while changing the data voltage Vdata supplied to the subpixel circuit.

A detailed method of calculating the resistance Rsent of the sensing transistor SENT is as follows.

First, the current Ids flowing from the drain node to the source node of the driving transistor DRT can be determined by the mobility u of the driving transistor DRT, the gate-source voltage Vgs, the threshold voltage Vth, and the drain-source voltage Vds as following equation.

$$I_{ds} = u(V_{gs} - Vth)V_{ds} - \frac{1}{2}V_{ds}^2 \quad \text{(Equation 1)}$$

Using the above, the resistance Rdrt between the drain node and the source node of the driving transistor DRT can be calculated as follows.

$$Rdrt = \frac{Vds}{Ids} = \frac{1}{u\left(Vgs - Vth - \frac{1}{2}Vds\right)} \quad \text{(Equation 2)}$$

At this time, a constant current Is is supplied to the subpixel circuit through the constant current source Isource during the resistance sensing period so that the current flowing through the sensing transistor SENT and the driving transistor DRT is the same as the constant current Is. For the above purpose, it is preferable that the driving voltage EVDD supplied during the resistance sensing period is maintained at a value lower than the turn-on level of the light emitting element ED in order to prevent current from flowing through the light emitting element ED during the resistance sensing period.

Accordingly, the voltage formed between the drain node of the driving transistor DRT to which the driving voltage EVDD is supplied and the reference voltage line RVL is the sum of the drain-source voltage of the driving transistor DRT and the drain-source voltages of the sensing transistor SENT.

$$Is(Rdrt + Rsent) = EVDD - Vsen = Is\left\{\frac{1}{u\left(Vgs - Vth - \frac{1}{2}Vds\right)} + Rsent\right\} \quad \text{(Equation 3)}$$

The above equation can be expressed as follows.

$$(EVDD - Vsen)\left(Vgs - Vth - \frac{1}{2}Vds\right) = \frac{I}{u} + IsRsent\left(Vgs - Vth - \frac{1}{2}Vds\right) \quad \text{(Equation 4)}$$

Meanwhile, when the data voltage Vdata1 of the first level and the data voltage Vdata2 of the second level different from each other are supplied during the resistance sensing period, the gate-source voltage Vgs and the drain-source voltage Vds of the driving transistor DRT, and the sensing voltage Vsen formed on the reference voltage line RVL will be changed.

Figure 10:
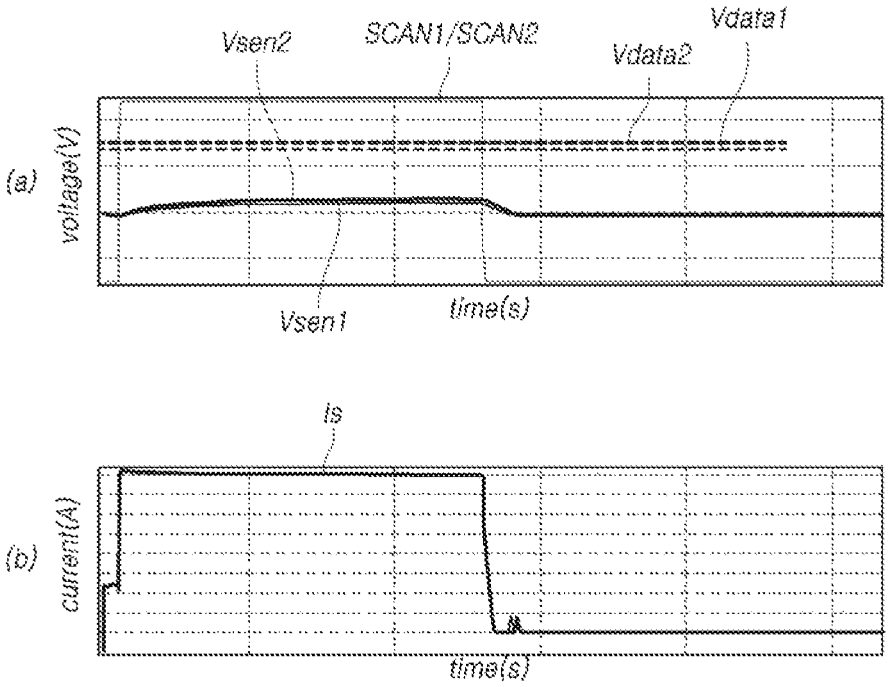
FIG. 10 illustrates an exemplary signal waveform diagram when a data voltage of a first level and a data voltage of a second level different from each other are supplied during a resistance sensing period in a display device according to embodiments of the present disclosure.

FIG. 10 illustrates exemplary signal waveform diagram when a data voltage of a first level and a data voltage of a second level different from each other are supplied during a resistance sensing period in a display device according to embodiments of the present disclosure.

Referring to FIG. 10, even though a first level data voltage Vdata1 and a second level data voltage Vdata2 different from each other are supplied during the resistance sensing period ((a) case of FIG. 10), the constant current Is flowing through the subpixel circuit maintains a constant value by the constant current source Isource ((b) case of FIG. 10) in the display device 100 according to embodiments of the present disclosure.

Meanwhile, the equations for the case of supplying the first level data voltage Vdata1 and the second level data voltage Vdata2 different from each other during the resistance sensing period will be as follows.

$$(EVDD - Vsen1)\left(Vgs1 - Vth - \frac{1}{2}Vds1\right) = \frac{I}{u} + IsRsent\left(Vgs1 - Vth - \frac{1}{2}Vds1\right) \quad \text{(Equation 5)}$$

$$(EVDD - Vsen2)\left(Vgs2 - Vth - \frac{1}{2}Vds2\right) = \frac{I}{u} + IsRsent\left(Vgs2 - Vth - \frac{1}{2}Vds2\right) \quad \text{(Equation 6)}$$

At this time, when the levels of the data voltages Vdata1, Vdata2 are set higher than the reference level of the driving voltage EVDD, the gate-source voltages Vgs1, Vgs2 of the driving transistor DRT become larger than the drain-source voltages Vds1, Vds2. In this case, since the drain-source voltage Vds can be ignored, the above equation has a linear relationship. For example, when the gate-source voltages Vgs1, Vgs2 of the driving transistor DRT are more than 5 times greater than the drain-source voltages Vds1, Vds2, the drain-source voltage Vds can be ignored.

Also, the gate-source voltages Vgs1, Vgs2 of the driving transistor DRT can be calculated as follows.

$$Vgs1 = Vdata1 - (IsRsent + Vsen1) \quad \text{(Equation 7)}$$

$$Vgs2 = Vdata2 - (IsRsent + Vsen2) \quad \text{(Equation 8)}$$

Here, the threshold voltage Vth of the driving transistor DRT can be measured during a threshold voltage sensing process, or can be used as a predetermined value during the manufacturing process of the display device 100.

Accordingly, the resistance Rsent between the drain node and the source node of the sensing transistor SENT can be calculated by supplying the first level data voltage Vdata1 and the second level data voltage Vdata2 different from each other during the resistance sensing period, and by using the variation values of the gate-source voltages Vgs1, Vgs2 of the driving transistor DRT and the sensing voltages Vsen1, Vsen2 of the reference voltage line RVL for each case.

When the resistance Rsent of the sensing transistor SENT is calculated, the mobility u and the resistance Rdrt of the driving transistor DRT can also be calculated.

The mobility u of the driving transistor DRT can be determined by subtracting the drain-source voltage of the sensing transistor SENT from the sensing voltage Vsen detected during the mobility sensing process. It can also be calculated by applying the resistance Rsent of the sensing transistor SENT to above equations.

Also, when the mobility u of the driving transistor DRT is determined, the resistance Rdrt of the driving transistor DRT can be calculated using Equation 2 above.

Accordingly, since the display device 100 of the present disclosure can accurately calculate the characteristic value of the driving transistor DRT by using the resistance Rsent of the sensing transistor SENT, deviation of the characteristic value of the driving transistor DRT can be compensated for using it.

Figure 11:
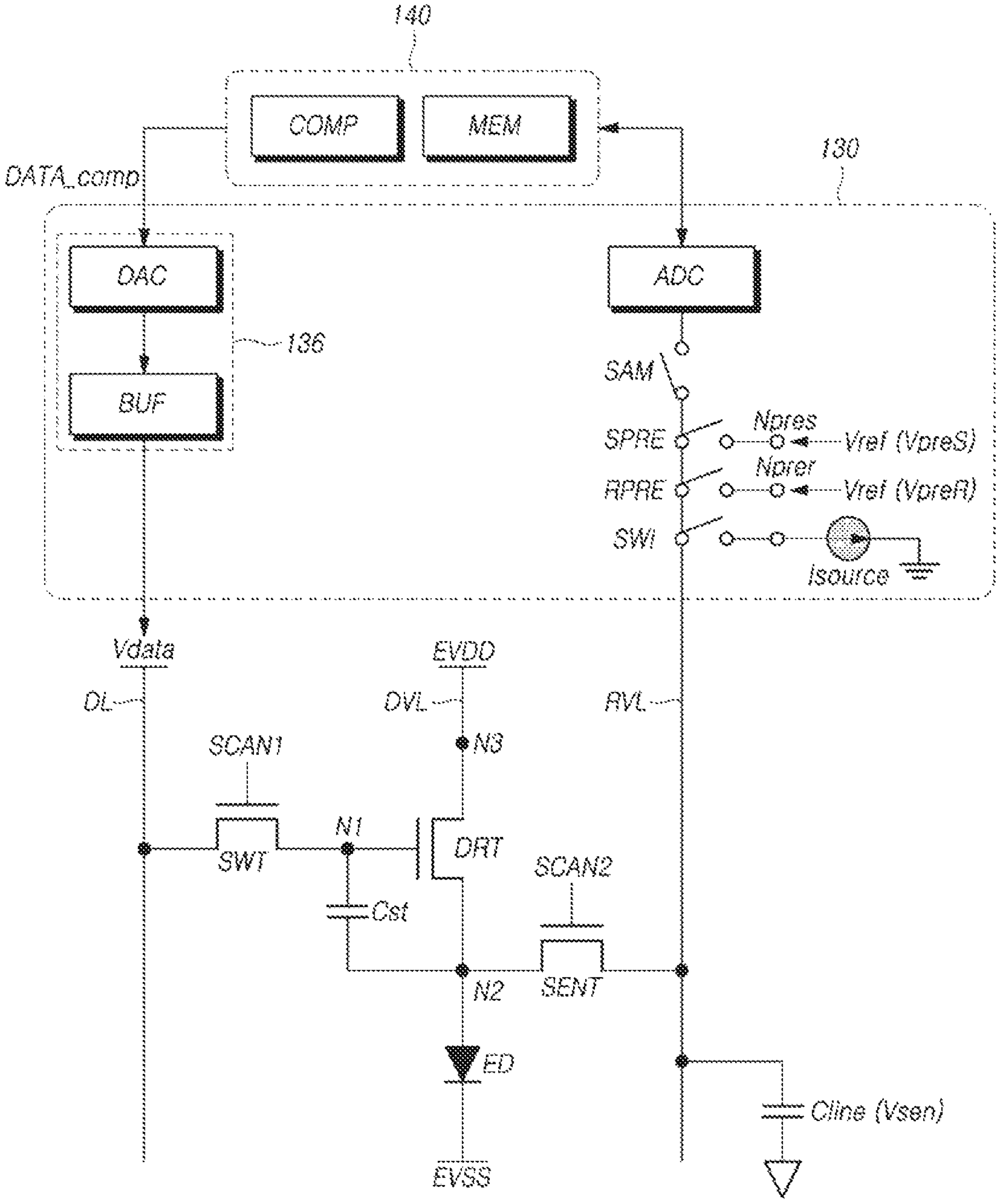
FIG. 11 illustrates an exemplary circuit structure to compensate for a characteristic value deviation of a driving transistor using a resistance of a sensing transistor in a display device according to embodiments of the present disclosure.

FIG. 11 illustrates an exemplary circuit structure to compensate for a characteristic value deviation of a driving transistor using a resistance of a sensing transistor in a display device according to embodiments of the present disclosure.

Referring to FIG. 11, a display device 100 according to embodiments of the present disclosure can include components for compensating for a characteristic value deviation of a driving transistor DRT.

For example, in the sensing period of the display device 100, the characteristic value or a change in the characteristic value of the driving transistor DRT can be supplied as the voltage of the second node N2 of the driving transistor DRT. The voltage of the second node N2 of the driving transistor DRT can correspond to the voltage of the reference voltage line RVL when the sensing transistor SENT is in the turned-on state.

The line capacitor Cline on the reference voltage line RVL can be charged by the voltage of the second node N2 of the driving transistor DRT. The reference voltage line RVL can have a voltage corresponding to the voltage of the second node N2 of the driving transistor DRT due to the sensing voltage Vsen charged to the line capacitor Cline.

In this structure, the characteristic value of the driving transistor DRT can be sensed more accurately by detecting the resistance Rsent of the sensing transistor SENT in advance before sensing the characteristic value of the driving transistor DRT.

For the above purpose, the display device 100 can include an analog-to-digital converter ADC that measures the voltage of the reference voltage line RVL and converts the voltage into a digital value, and a switch circuit SAM and SPRE for sensing the characteristic value.

In addition, the display device 100 of the present disclosure can include a constant current Isource for supplying a constant current Is to the subpixel circuit in order to calculate the resistance Rsent of the sensing transistor SENT, and a constant current switch SWI for controlling the supply of the constant current Is.

The switch circuit SAM and SPRE for controlling the sensing driving can include a sensing reference switch SPRE for controlling the connection between each reference voltage line RVL and the sensing reference voltage supply node Npres to which the reference voltage Vref is supplied and a sampling switch SAM for controlling the connection between each reference voltage line RVL and the analog-to-digital converter ADC. The sensing reference switch SPRE is a switch for controlling sensing driving, and the reference voltage Vref supplied to the reference voltage line RVL by the sensing reference switch SPRE becomes the sensing reference voltage VpreS.

The switch circuit for sensing the characteristic value of the driving transistor DRT can include a display reference switch RPRE for controlling display driving. The display reference switch RPRE can control the connection between each reference voltage line RVL and the display reference voltage supply node Nprer to which the reference voltage Vref is supplied. The display reference switch RPRE is a switch used to drive the display, and the reference voltage Vref supplied to the reference voltage line RVL by the display reference switch RPRE corresponds to the display reference voltage VpreR.

In addition, the switch circuit of the display device 100 can include a constant current switch SWI for controlling the supply of the constant current Is to the subpixel circuit. The constant current switch SWI can control the connection between the constant current source Isource and the reference voltage line RVL.

The constant current switch SWI supplies the constant current Is to the subpixel circuit by being turned on before the sensing period for sensing the characteristic value of the driving transistor DRT starts. Accordingly, a resistance sensing period for detecting the resistance Rsent of the sensing transistor SENT can be proceeded. The resistance Rsent of the sensing transistor SENT can be detected by detecting the level of the sensing voltage Vsen that is changed by supplying the data voltage Vdata at a plurality of levels in the resistance sensing period.

In this case, the sensing reference switch SPRE, the display reference switch RPRE, and the constant current switch SWI can be separately provided or can be integrated into one.

The timing controller 140 of the display device 100 can include a memory MEM for storing the data transferred from the analog-to-digital converter ADC or previously storing a reference value and a compensation circuit COMP that compares the reference value stored in the memory MEM and the received data and compensates for the deviation in characteristic value. In this case, the compensation value calculated by the compensation circuit COMP can be stored in the memory MEM.

Accordingly, the timing controller 140 can compensate for the image data DATA to be supplied to the data driving circuit 130 by using the compensation value calculated by the compensation circuit COMP and can supply the compensated image data DATA comp to the data driving circuit 130.

Accordingly, the data driving circuit 130 can convert the compensated image data DATA comp into an analog signal type of data voltage Vdata through a digital-to-analog converter DAC and supply the converted data voltage Vdata to the data line DL through an output buffer BUF. As a result, the deviation in characteristic value (e.g., deviation in threshold voltage deviation or deviation in mobility) for the driving transistor DRT in the corresponding subpixel SP can be compensated.

As described above, the display device 100 of the present disclosure can sense more accurately the characteristic value of the driving transistor DRT by detecting the resistance Rsent of the sensing transistor SENT in advance before sensing the characteristic value of the driving transistor DRT. As a result, the timing controller 140 can supply the compensation image data DATA_comp capable of accurately compensating for the characteristic value deviation of the driving transistor DRT.

The data driving circuit 130 can include a data voltage output circuit 136 including a latch circuit, a digital-to-analog converter DAC, and an output buffer BUF and, in some cases, the analog-to-digital converter ADC and various switches SAM, SPRE, RPRE, SWI can be positioned outside the data driving circuit 130.

The compensation circuit COMP can be present inside or outside the timing controller 140. The memory MEM can be positioned outside the timing controller 140 or can be implemented, in the form of a register, inside the timing controller 140.

Figure 12:
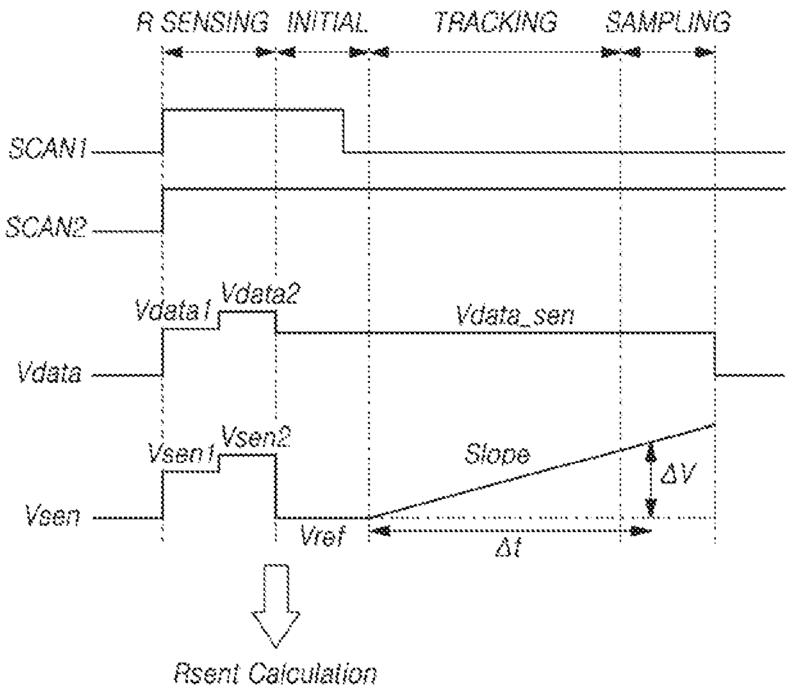
FIG. 12 illustrates a signal timing diagram to compensate for mobility of a driving transistor using a resistance of a sensing transistor in a display device according to embodiments of the present disclosure.

FIG. 12 illustrates a signal timing diagram to compensate for mobility of a driving transistor using a resistance of a sensing transistor in a display device according to embodiments of the present disclosure.

Referring to FIG. 12, the display device 100 according to embodiments of the present disclosure can include a resistance sensing period R SENSING for detecting the resistance Rsent of the sensing transistor SENT and a characteristic value determining period of the driving transistor DRT.

In the resistance sensing period R SENSING, a constant current Is is supplied to the subpixel circuit while the switching transistor SWT is turned on by the first scan signal SCAN1 of the turn-on level, and the sensing transistor SENT is turned on by the second scan signal SCAN2 of the turn-on level.

In this state, the resistance Rsent between the drain node and the source node of the sensing transistor SENT can be calculated by supplying data voltages Vdata1, Vdata2 with different levels, and detecting the variation of the sensing voltages Vsen1, Vsen2 on the reference voltage line RVL for each case during the resistance sensing period R SENSING.

In this case, the levels of the data voltages Vdata1, Vdata2 can be determined higher than the driving voltage EVDD by a certain level or more. Accordingly, since the gate-source voltages Vgs1, Vgs2 of the driving transistor DRT are greater than the drain-source voltages Vds1, Vds2, the resistance Rsent of the sensing transistor SENT can be simply calculated through a linear relationship.

In addition, in order to prevent current from flowing in the light emitting element ED during the resistance sensing period R SENSING, it is preferable to keep the level of the driving voltage EVDD supplied during the resistance sensing period R SENSING below the turn-on level of the light emitting element ED.

The sensing process of the mobility of the driving transistor DRT can be performed in an initialization phase INITIAL, a tracking phase TRACKING, and a sampling phase SAMPLING.

In the initialization phase INITIAL, the switching transistor SWT can be turned on by the first scan signal SCAN1 of the turn-on level, so that the first node N1 of the driving transistor DRT is initialized to the sensing data voltage Vdata_sen for mobility sensing. Further, the sensing transistor SENT is turned on by the second scan signal SCAN2 of the turn-on level and, in this state, the second node N2 of the driving transistor DRT is initialized to the reference voltage Vref.

The tracking phase TRACKING is a phase for tracking the mobility of the driving transistor DRT. The mobility of the driving transistor DRT can indicate the current driving capability of the driving transistor DRT, and the voltage of the second node N2 of the driving transistor DRT capable of calculating the mobility of the driving transistor DRT is tracked through the tracking phase TRACKING.

In the tracking phase TRACKING, the switching transistor SWT is turned off by the first scan signal SCAN1 of the turn-off level, and the switch where the reference voltage Vref is supplied is cut off. Accordingly, both the first node N1 and the second node N2 of the driving transistor DRT float, and the voltages of the first node N1 and the second node N2 of the driving transistor DRT, both, increase.

In particular, since the voltage of the second node N2 of the driving transistor DRT is initialized to the reference voltage Vref, it starts to increase from the reference voltage Vref. In this case, since the sensing transistor SENT is on, the increase in the voltage of the second node N2 of the driving transistor DRT leads to an increase in the voltage of the reference voltage line RVL.

In the sampling phase SAMPLING, the characteristic value sensing circuit detects the voltage of the second node N2 of the driving transistor DRT, a predetermined time $\Delta t$ after the voltage of the second node N2 starts to increase.

In this case, the sensing voltage detected by the characteristic value sensing circuit indicates a voltage $Vref+\Delta V$ which is the reference voltage Vref plus a predetermined voltage $\Delta V$, and the mobility of the driving transistor DRT can be calculated based on the so-detected sensing voltage $Vref+\Delta V$, the reference voltage Vref which is already known, and the increment time $\Delta t$ of the voltage of the second node N2.

In other words, the mobility of the driving transistor DRT is proportional to the voltage variation AV/At per unit time of the reference voltage line RVL through the tracking phase TRACKING and the sampling phase SAMPLING. Accordingly, the mobility of the driving transistor DRT will be proportional to the slope of the voltage waveform of the reference voltage line RVL.

At this time, the mobility of the driving transistor DRT can be more accurately determined by applying the resistance Rsent of the sensing transistor SENT detected in the resistance sensing period R SENSING.

In the above, it has illustrated the case of determining the mobility of the driving transistor DRT by using the resistance Rsent of the sensing transistor SENT, but the threshold voltage of the driving transistor DRT can be calculated by using the resistance Rsent of the sensing transistor SENT.

Figure 13:
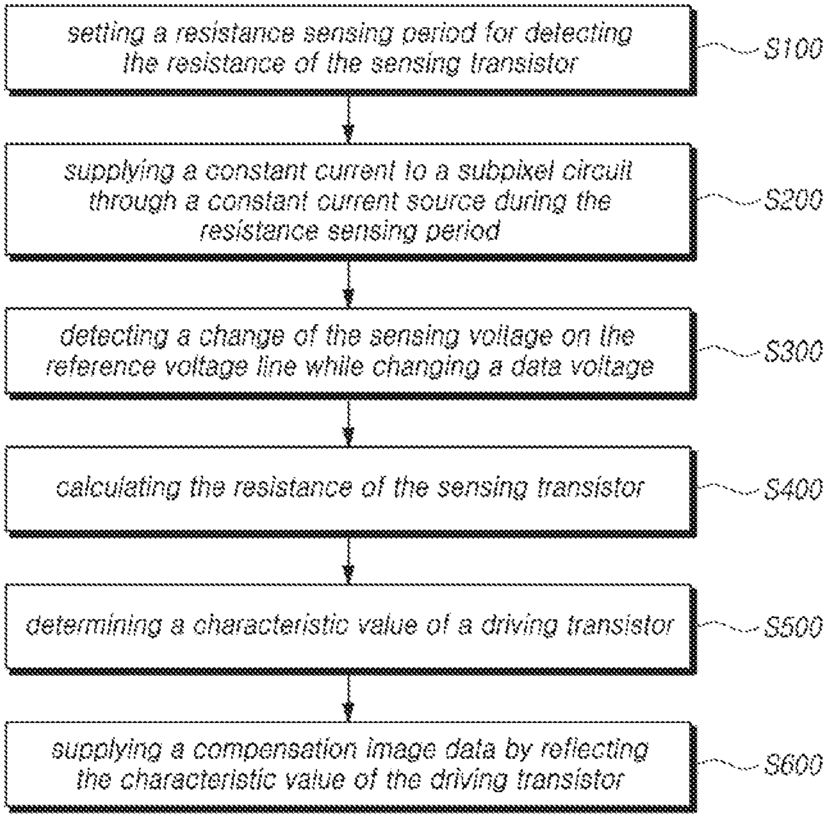
FIG. 13 illustrates a flowchart of a display driving method according to embodiments of the present disclosure.

FIG. 13 illustrates a flowchart of a display driving method according to embodiments of the present disclosure.

Referring to FIG. 13, the display driving method according to embodiments of the present disclosure can include a step S100 of setting a resistance sensing period R SENSING for detecting the resistance Rsent of the sensing transistor SENT, a step S200 of supplying a constant current Is to a subpixel circuit through a constant current source Isource during the resistance sensing period R SENSING, a step S300 of detecting a change of the sensing voltage Vsen on the reference voltage line RVL while changing a data voltage Vdata, a step S400 of calculating the resistance Rsent of the sensing transistor SENT, a step S500 of determining a characteristic value of a driving transistor DRT, and a step S600 of supplying a compensation image data DATA_comp by reflecting the characteristic value of the driving transistor DRT.

The step S100 of setting a resistance sensing period R SENSING for detecting the resistance Rsent of the sensing transistor SENT is a process of setting a period for detecting the resistance Rsent of the sensing transistor SENT before sensing the characteristic value of the driving transistor DRT.

The step S200 of supplying a constant current Is to a subpixel circuit through a constant current source Isource during the resistance sensing period R SENSING is a process of allowing the constant current Is to flow through the subpixel circuit through the constant current source Isource during the resistance sensing period R SENSING. The display device 100 of the present disclosure can include a constant current source Isource disposed in the data driving circuit 130 and detect the resistance Rsent of the sensing transistor SENT using a constant current Is flowing through the subpixel circuit during the resistance sensing period R SENSING.

The step S300 of detecting a change of the sensing voltage Vsen on the reference voltage line RVL while changing a data voltage Vdata is a process of detecting a change of the sensing voltage Vsen on the reference voltage line RVL while changing the data voltage Vdata supplied to the subpixel circuit in a state in which the constant current Is flows through the subpixel circuit through the constant current source Isource during the resistance sensing period R SENSING.

When a first level data voltage Vdata1 and a second level data voltage Vdata2 different from each other are supplied during the resistance sensing period R SENSING, the gate-source voltages Vgs1, Vgs2 of the driving transistor DRT and the sensing voltages Vsen1, Vsen2 on the reference voltage line RVL in each case are changed. The display device 100 of the present disclosure can calculate the resistance Rsent of the sensing transistor SENT by using a change value of the sensing voltage Vsen according to the data voltage Vdata during the resistance sensing period R SENSING.

At this time, the levels of the data voltages Vdata1, Vdata2 supplied during the resistance sensing period R SENSING are determined higher than the driving voltage EVDD by a certain level or more, thereby the resistance Rsent of the sensing transistor SENT can be calculated easily.

In addition, it is preferable to maintain the level of the driving voltage EVDD lower than the turn-on level of the light emitting element ED in order that a current does not flow through the light emitting element ED during the resistance sensing period R SENSING.

The step S400 of calculating the resistance Rsent of the sensing transistor SENT is a process of calculating the resistance Rsent of the sensing transistor SENT by using a variation of the sensing voltage Vsen according to a variation of the data voltage Vdata during the resistance sensing period R SENSING.

At this time, the resistance Rsent of the sensing transistor SENT can be calculated using the following equation.

$$(EVDD - Vsen)\left(Vgs - Vth - \frac{1}{2}Vds\right) = \frac{I}{u} + IsRsent\left(Vgs - Vth - \frac{1}{2}Vds\right)$$

At this time, EVDD is a driving voltage, Vsen is a sensing voltage detected through a reference voltage line RVL, Vgs is a gate-source voltage of the driving transistor DRT, Vth is a threshold voltage of the driving transistor DRT, Vds is the drain-source voltage of the driving transistor DRT, u is a mobility of the driving transistor DRT, Is is a constant current flowing through the subpixel circuit, and Rsent is a resistance of the sensing transistor SENT.

The step S500 of determining a characteristic value of a driving transistor DRT is a process of determining the characteristic value of the driving transistor DRT using the resistance Rsent of the sensing transistor SENT.

In this case, the characteristic value of the driving transistor DRT can be determined by using an equation calculated the resistance Rsent of the sensing transistor SENT, or by applying the resistance Rsent of the sensing transistor SENT to the sensing voltage Vsen detected through the reference voltage line RVL in the characteristic value sensing process.

The step S600 of supplying a compensation image data DATA comp by reflecting the characteristic value of the driving transistor DRT is a process the timing controller 140 determines the compensation image data DATA comp by reflecting the characteristic value of the driving transistor DRT and supply the compensation image data DATA comp to the data driving circuit 130.

Through the above process, the display device 100 of the present disclosure can accurately determine the characteristic value of the driving transistor DRT using the resistance Rsent of the sensing transistor SENT, and precisely compensate for the characteristic value deviation.

A brief description of the embodiments of the present disclosure described above is as follows.

A display device 100 according to embodiments of the present disclosure can include a display panel 110 in which a plurality of subpixel circuits including a light emitting element ED, a driving transistor DRT, and a sensing transistor SENT are disposed, a gate driving circuit 120 configured to supply a plurality of scan signals SCAN to the display panel 110 through a plurality of gate lines GL, a data driving circuit 130 configured to supply a plurality of data voltages Vdata to the display panel 110 through a plurality of data lines DL and supply a constant current Is to the plurality of subpixel circuits during a resistance sensing period R SENSING, and a timing controller 140 configured to control the gate driving circuit 120 and the data driving circuit 130, and supply compensation image data DATA comp to the display panel 110 by using the resistance Rsent of the sensing transistor SENT detected in the resistance sensing period R SENSING.

The subpixel circuit can include the driving transistor DRT configured to provide a current to the light emitting element ED, a switching transistor SWT electrically connected between a gate node of the driving transistor DRT and the data line DL, the sensing transistor SENT electrically connected between a source node or a drain node of the driving transistor DRT and a reference voltage line RVL, and a storage capacitor Cst electrically connected between a gate node of the driving transistor DRT, and a source node or a drain node of the sensing transistor SENT.

The data driving circuit 130 can include an analog-to-digital converter ADC configured to convert a sensing voltage Vsen detected from the reference voltage line RVL into a digital value, a sampling switch SAM configured to control a connection between the reference voltage line RVL and the analog-to-digital converter ADC, a constant current source Isource configured to supply a constant current Is to the plurality of subpixel circuits in the resistance sensing period R SENSING, and a constant current switch SWI configured to control a connection between the constant current source Isource and the reference voltage line RVL.

A level of a driving voltage EVDD supplied to the driving transistor DRT during the resistance sensing period R SENSING can be lower than a turn-on level of the light emitting element ED.

A level of the data voltage Vdata supplied during the resistance sensing period R SENSING can be higher than the level of the driving voltage EVDD.

The level of the data voltage Vdata can be determined so that a gate-source voltage of the driving transistor DRT is at least 5 times greater than a drain-source voltage the driving transistor DRT.

The resistance Rsent of the sensing transistor can be calculated using a first sensing voltage Vsen1 and a second sensing voltage Vsen2 of the reference voltage line RVL detected by a first level data voltage Vdata1 and a second level data voltage Vdata2 supplied during the resistance sensing period R SENSING.

The resistance Rsent of the sensing transistor can be calculated using an equation below:

$$(EVDD - Vsen)\left(Vgs - Vth - \frac{1}{2}Vds\right) = \frac{I}{u} + IsRsent\left(Vgs - Vth - \frac{1}{2}Vds\right)$$

wherein, EVDD is a driving voltage, Vsen is a sensing voltage, Vgs is a gate-source voltage of the driving transistor, Vth is a threshold voltage of the driving transistor, Vds is a drain-source voltage of the driving transistor, u is mobility of the driving transistor, Is is a constant current flowing through the subpixel circuit, and Rsent is the resistance of the sensing transistor. Here, 'IsRsent' preferably means Is is multiplied by Rsent.

The timing controller 140 can be configured to calculate the mobility of the driving transistor DRT from the resistance Rsent of the sensing transistor by using the above equation.

The timing controller 140 can be configured to determine the compensation image data DATA_comp by reflecting the resistance Rsent of the sensing transistor to a characteristic value of the driving transistor DRT determined in a characteristic value determining period after the resistance sensing period R SENSING.

A data driving circuit 130 for supplying a plurality of data voltages Vdata to a display panel 110 in which a plurality of subpixel circuits including a light emitting element ED, a driving transistor DRT, and a sensing transistor SENT are disposed according to embodiments of the present disclosure can include an analog-to-digital converter ADC configured to convert a sensing voltage Vsen detected from a reference voltage line RVL into a digital value, a sampling switch SAM configured to control a connection between the reference voltage line RVL and the analog-to-digital converter ADC, a constant current source Isource configured to supply a constant current Is to the plurality of subpixel circuits in the resistance sensing period R SENSING, and a constant current switch SWI configured to control a connection between the constant current source Isource and the reference voltage line RVL.

The resistance Rsent of the sensing transistor can be calculated using a first sensing voltage Vsen1 and a second sensing voltage Vsen2 of the reference voltage line RVL detected by a first level data voltage Vdata1 and a second level data voltage Vdata2 supplied during the resistance sensing period R SENSING.

A display driving method of a display panel 110 in which a plurality of subpixel circuits including a light emitting element ED, a driving transistor DRT, and a sensing transistor SENT are disposed according to embodiments of the present disclosure can include setting a resistance sensing period R SENSING for detecting a resistance Rsent of the sensing transistor, supplying a constant current Is to the plurality of subpixel circuits through a constant current source Isource during the resistance sensing period R SENSING, detecting a change of a sensing voltage Vsen on a reference voltage line RVL while changing a data voltage Vdata, calculating the resistance Rsent of the sensing transistor, determining a characteristic value of the driving transistor DRT using the resistance Rsent of the sensing transistor, and supplying a compensation DATA_comp by reflecting the image data characteristic value of the driving transistor DRT.

The resistance sensing period R SENSING can be performed before a characteristic value determining period of the driving transistor DRT.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein can be applied to other embodiments and applications without departing from the spirit and scope of the present invention. The above description and the accompanying drawings provide an example of the technical idea of the present invention for illustrative purposes only. For example, the disclosed embodiments are intended to illustrate the scope of the technical idea of the present invention.

Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A display device comprising:

a display panel in which a plurality of subpixel circuits including a light emitting element, a driving transistor, and a sensing transistor are disposed;

a gate driving circuit configured to supply a plurality of scan signals to the display panel through a plurality of gate lines;

a data driving circuit configured to supply a plurality of data voltages to the display panel through a plurality of data lines, and supply a constant current to the plurality of subpixel circuits and detect a resistance of the sensing transistor based on the constant current during a resistance sensing period; and a timing controller configured to control the gate driving circuit and the data driving circuit, and supply compensation image data to the display panel by using the resistance of the sensing transistor detected in the resistance sensing period, wherein the resistance of the sensing transistor is calculated using a first sensing voltage and a second sensing voltage of the reference voltage line detected by a first level data voltage and a second level data voltage supplied during the resistance sensing period.

2. The display device according to claim 1, wherein each of at least one of the plurality of subpixel circuits includes:

the driving transistor configured to provide a current to the light emitting element;

a switching transistor electrically connected between a gate node of the driving transistor and a corresponding data line;

the sensing transistor electrically connected between a source node or a drain node of the driving transistor and a reference voltage line; and a storage capacitor electrically connected between a gate node of the driving transistor, and a source node or a drain node of the sensing transistor.

3. The display device according to claim 1, wherein the data driving circuit includes:

an analog-to-digital converter configured to convert a sensing voltage detected from a reference voltage line into a digital value;

a sampling switch configured to control a connection between the reference voltage line and the analog-to-digital converter;

a constant current source configured to supply a constant current to the plurality of subpixel circuits in the resistance sensing period; and a constant current switch configured to control a connection between the constant current source and the reference voltage line.

4. The display device according to claim 1, wherein a level of a driving voltage supplied to the driving transistor during the resistance sensing period is lower than a turn-on level of the light emitting element.

5. The display device according to claim 4, wherein a level of the data voltage supplied during the resistance sensing period is higher than the level of the driving voltage.

6. The display device according to claim 5, wherein the level of the data voltage is determined so that a gate-source voltage of the driving transistor is at least 5 times greater than a drain-source voltage the driving transistor.

7. The display device according to claim 1, wherein the resistance of the sensing transistor is calculated using an equation below:

$$(EVDD - Vsen)\left(Vgs - Vth - \frac{1}{2}Vds\right) = \frac{I}{u} + IsRsent\left(Vgs - Vth - \frac{1}{2}Vds\right)$$

wherein, EVDD is a driving voltage, Vsen is a sensing voltage, Vgs is a gate-source voltage of the driving transistor, Vth is a threshold voltage of the driving transistor, Vds is a drain-source voltage of the driving transistor, u is a mobility of the driving transistor, Is a constant current flowing through the subpixel circuit, and Rsent is the resistance of the sensing transistor.

8. The display device according to claim 7, wherein the timing controller is configured to calculate the mobility of the driving transistor from the resistance of the sensing transistor by using the above equation.

9. The display device according to claim 1, wherein the timing controller is configured to determine the compensation image data by reflecting the resistance of the sensing transistor to a characteristic value of the driving transistor determined in a characteristic value determining period after the resistance sensing period.

10. A data driving circuit for supplying a plurality of data voltages to a display panel in which a plurality of subpixel circuits including a light emitting element, a driving transistor, and a sensing transistor are disposed, the data driving circuit comprising:

an analog-to-digital converter configured to convert a sensing voltage detected from a reference voltage line into a digital value;

a sampling switch configured to control a connection between the reference voltage line and the analog-to-digital converter;

a constant current source configured to supply a constant current to the plurality of subpixel circuits in a resistance sensing period; and a constant current switch configured to control a connection between the constant current source and the reference voltage line.

11. The data driving circuit according to claim 10, wherein a resistance of the sensing transistor is calculated using a first sensing voltage and a second sensing voltage of the reference voltage line detected by a first level data voltage and a second level data voltage supplied during the resistance sensing period.

12. A display driving method for a display panel in which a plurality of subpixel circuits including a light emitting element, a driving transistor, and a sensing transistor are disposed, the display driving method comprising:

setting a resistance sensing period for detecting a resistance of the sensing transistor;

supplying a constant current to the plurality of subpixel circuits through a constant current source during the resistance sensing period;

detecting a change of a sensing voltage on a reference voltage line while changing a data voltage;

calculating the resistance of the sensing transistor;

determining a characteristic value of the driving transistor using the resistance of the sensing transistor; and supplying a compensation image data by reflecting the characteristic value of the driving transistor.

13. The display driving method according to claim 12, wherein the resistance sensing period is performed before a characteristic value determining period of the driving transistor.

14. The display driving method according to claim 12, wherein a level of a driving voltage supplied to the driving transistor during the resistance sensing period is lower than a turn-on level of the light emitting element.

15. The display driving method according to claim 12, wherein a level of the data voltage supplied during the resistance sensing period is higher than the level of the driving voltage.

16. The display driving method according to claim 15, wherein the level of the data voltage is determined so that a gate-source voltage of the driving transistor is at least 5 times greater than a drain-source voltage the driving transistor.

17. The display driving method according to claim 12, wherein the resistance of the sensing transistor is calculated using an equation below:

$$(EVDD - Vsen)\left(Vgs - Vth - \frac{1}{2}Vds\right) = \frac{I}{u} + IsRsent\left(Vgs - Vth - \frac{1}{2}Vds\right)$$

wherein, EVDD is a driving voltage, Vsen is a sensing voltage, Vgs is a gate-source voltage of the driving transistor, Vth is a threshold voltage of the driving transistor, Vds is a drain-source voltage of the driving transistor, u is a mobility of the driving transistor, Is a constant current flowing through the subpixel circuit, and Rsent is the resistance of the sensing transistor.

18. The display driving method according to claim 17, wherein the characteristic value of the driving transistor corresponds to the mobility of the driving transistor obtained based on the resistance of the sensing transistor by using the above equation.

19. The display driving method according to claim 12, wherein the compensation image data is determined by reflecting the resistance of the sensing transistor to the characteristic value of the driving transistor determined in a characteristic value determining period after the resistance sensing period.

* * * * *